United States Patent
Sengoku

(10) Patent No.: US 9,852,104 B2
(45) Date of Patent: Dec. 26, 2017

(54) COEXISTENCE OF LEGACY AND NEXT GENERATION DEVICES OVER A SHARED MULTI-MODE BUS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 14/626,847

(22) Filed: Feb. 19, 2015

(65) Prior Publication Data

US 2015/0234774 A1    Aug. 20, 2015

Related U.S. Application Data

(60) Provisional application No. 61/942,215, filed on Feb. 20, 2014.

(51) Int. Cl.
G06F 13/42    (2006.01)

(52) U.S. Cl.
CPC ...... *G06F 13/4291* (2013.01); *G06F 13/4295* (2013.01)

(58) Field of Classification Search
None
See application file for complete search history.

(56) References Cited

U.S. PATENT DOCUMENTS

| | | |
|---|---|---|
| 6,574,233 B1 | 6/2003 | Fuller, Jr. et al. |
| 6,952,751 B1 | 10/2005 | Gulick |
| 7,039,734 B2 | 5/2006 | Sun et al. |
| 2004/0153726 A1 | 8/2004 | Suzuki |
| 2011/0194595 A1* | 8/2011 | Shetty ............ H04W 52/52 375/224 |
| 2014/0013017 A1* | 1/2014 | DeCesaris ............ G06F 13/385 710/105 |
| 2014/0372642 A1 | 12/2014 | Sengoku et al. |
| 2015/0370735 A1 | 12/2015 | Pitigoi-Aron et al. |
| 2016/0195910 A1 | 7/2016 | Sengoku et al. |

FOREIGN PATENT DOCUMENTS

WO    WO-0042740 A1    7/2000

OTHER PUBLICATIONS

International Search Report and Written Opinion—PCT/US2015/016925—ISA/EPO—May 26, 2015.

* cited by examiner

*Primary Examiner* — Idriss N Alrobaye
*Assistant Examiner* — Dayton Lewis-Taylor
(74) *Attorney, Agent, or Firm* — Loza & Loza LLP

(57) ABSTRACT

A device is provided comprising a bus, a first set of devices, and a second set of devices. The first set of devices is coupled to the bus and configured to communicate over the bus according to a first communication protocol. The second set of devices is coupled to the bus and configured to communicate over the bus according to both the first communication protocol and a second communication protocol. In a first mode of operation, the first set of devices and second set of devices may concurrently communicate over the bus using the first communication protocol. In a second mode of operation, the second set of devices communicate with each other using the second communication protocol over the bus, and the first set of devices to stop operating on the bus.

48 Claims, 25 Drawing Sheets

$$\begin{aligned}
\text{Bits} &= T_{11} \times 3^{11} \\
&+ T_{10} \times 3^{10} \\
&+ T_9 \times 3^9 \\
&+ T_8 \times 3^8 \\
&+ T_7 \times 3^7 \\
&+ T_6 \times 3^6 \\
&+ T_5 \times 3^5 \\
&+ T_4 \times 3^4 \\
&+ T_3 \times 3^3 \\
&+ T_2 \times 3^2 \\
&+ T_1 \times 3 \\
&+ T_0
\end{aligned}$$

*FIG. 20*

$$T_{11} = \text{Bits} / 3^{11} \quad , \quad M_{11} = \text{Bits} \, \% \, 3^{11}$$
$$T_{10} = M_{11} / 3^{10} \quad , \quad M_{10} = M_{11} \, \% \, 3^{10}$$
$$T_9 = M_{10} / 3^9 \quad , \quad M_9 = M_{10} \, \% \, 3^9$$
$$T_8 = M_9 / 3^8 \quad , \quad M_8 = M_9 \, \% \, 3^8$$
$$T_7 = M_8 / 3^7 \quad , \quad M_7 = M_8 \, \% \, 3^7$$
$$T_6 = M_7 / 3^6 \quad , \quad M_6 = M_7 \, \% \, 3^6$$
$$T_5 = M_6 / 3^5 \quad , \quad M_5 = M_6 \, \% \, 3^5$$
$$T_4 = M_5 / 3^4 \quad , \quad M_4 = M_5 \, \% \, 3^4$$
$$T_3 = M_4 / 3^3 \quad , \quad M_3 = M_4 \, \% \, 3^3$$
$$T_2 = M_3 / 3^2 \quad , \quad M_2 = M_3 \, \% \, 3^2$$
$$T_1 = M_2 / 3 \quad , \quad M_1 = M_2 \, \% \, 3$$
$$T_0 = M_1$$

*FIG. 21*

$$T_{11} = (\text{Bits} \geq 3^{11} \times 2) \, ? \, 2 : (\text{Bits} \geq 3^{11}) \, ? \, 1 : 0, \quad M_{11} = \text{Bits} - T_{11} \times 3^{11}$$
$$T_{10} = (M_{11} \geq 3^{10} \times 2) \, ? \, 2 : (M_{11} \geq 3^{10}) \, ? \, 1 : 0, \quad M_{10} = M_{11} - T_{10} \times 3^{10}$$
$$T_9 = (M_{10} \geq 3^9 \times 2) \, ? \, 2 : (M_{10} \geq 3^9) \, ? \, 1 : 0, \quad M_9 = M_{10} - T_9 \times 3^9$$
$$T_8 = (M_9 \geq 3^8 \times 2) \, ? \, 2 : (M_9 \geq 3^8) \, ? \, 1 : 0, \quad M_8 = M_9 - T_8 \times 3^8$$
$$T_7 = (M_8 \geq 3^7 \times 2) \, ? \, 2 : (M_8 \geq 3^7) \, ? \, 1 : 0, \quad M_7 = M_8 - T_7 \times 3^7$$
$$T_6 = (M_7 \geq 3^6 \times 2) \, ? \, 2 : (M_7 \geq 3^6) \, ? \, 1 : 0, \quad M_6 = M_7 - T_6 \times 3^6$$
$$T_5 = (M_6 \geq 3^5 \times 2) \, ? \, 2 : (M_6 \geq 3^5) \, ? \, 1 : 0, \quad M_5 = M_6 - T_5 \times 3^5$$
$$T_4 = (M_5 \geq 3^4 \times 2) \, ? \, 2 : (M_5 \geq 3^4) \, ? \, 1 : 0, \quad M_4 = M_5 - T_4 \times 3^4$$
$$T_3 = (M_4 \geq 3^3 \times 2) \, ? \, 2 : (M_4 \geq 3^3) \, ? \, 1 : 0, \quad M_3 = M_4 - T_3 \times 3^3$$
$$T_2 = (M_3 \geq 3^2 \times 2) \, ? \, 2 : (M_3 \geq 3^2) \, ? \, 1 : 0, \quad M_2 = M_3 - T_2 \times 3^2$$
$$T_1 = (M_2 \geq 3 \times 2) \, ? \, 2 : (M_2 \geq 3) \, ? \, 1 : 0, \quad M_1 = M_2 - T_1 \times 3$$
$$T_0 = M_1$$

*FIG. 22*

COEXISTENCE OF LEGACY AND NEXT GENERATION DEVICES OVER A SHARED MULTI-MODE BUS

CROSS-REFERENCE TO RELATED APPLICATIONS

The present application for patent claims priority to Provisional Application No. App. No.: 61/942,215, entitled "Technique to Transition from CCIe-Compatible Devices to Next Generation Devices" filed Feb. 20, 2014, which is assigned to the assignee hereof and hereby expressly incorporated by reference herein.

FIELD

The present disclosure pertains to techniques to permit devices of different generations to coexist when coupled to a shared bus and, more particularly, to permit next-generation devices to disable legacy devices on the shared bus.

BACKGROUND

I2C (also referred to as I²C) is a multi-master serial single-ended bus used for attaching low-speed peripherals to a motherboard, embedded system, cellphone, or other electronic devices. The I2C bus includes a clock (SCL) and data (SDA) lines with 7-bit addressing. The bus has two roles for devices: master and slave. A master device is a node that generates the clock and initiates communication with slave devices. A slave device is a node that receives the clock and responds when addressed by the master device. The I2C bus is a multi-master bus which means any number of master devices can be present. Additionally, master and slave roles may be changed between messages (after a STOP is sent). I2C defines basic types of messages, each of which begins with a START and ends with a STOP.

I2C (also referred to as I²C) is a multi-master serial single-ended control data bus used for attaching low-speed peripherals to a motherboard, embedded system, cellphone, or other electronic devices. The I2C control data bus includes a clock (SCL) and data (SDA) lines with 7-bit addressing. The control data bus has two roles for nodes: master and slave. A master node is a node that generates the clock and initiates communication with slave nodes. A slave node is a node that receives the clock and responds when addressed by the master. The I2C control data bus is a multi-master control data bus which means any number of master nodes can be present. Additionally, master and slave roles may be changed between messages. I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave devices). In one example, the CCI protocol may be implemented over an I2C serial bus between the image sensor and the baseband processor.

An extension to CCI called CCIe (Camera Control Interface extended) has been developed that encodes information for transmission over the shared bus. CCIe does not implement a separate clock line on the shared bus. Instead, it embeds a clock within the transmitted transcoded information.

CCIe is designed to coexist with I2C-compatible devices and share the same bus. For instance, CCIe-compatible devices and I2C-compatible devices may operate concurrently on a shared data control bus. While I2C-compatible devices use a first line of the bus for data and a second line of the bus for a clock, CCIe-compatible devices use both bus lines for data transmissions. The CCIe protocol permits improving the data rate over the two-line bus while I2C-compatible devices are coupled to the shared bus. CCIe-compatible devices are being introduced while I2C-compatible devices are phased out. Eventually, when I2C-compatible devices are phased out, CCIe-only buses may be used. At some point in the future, CCIe may be phased out by the introduction of next generation devices.

It is during this phase out period of CCIe-compatible devices that a mechanism may be needed to allow it to coexist with next generation devices. For instance, in buses that may be shared by both legacy devices (e.g., CCIe-compatible devices) and next-generation devices, a mechanism is needed to allow slave devices to be selectively disabled by next-generation devices.

Therefore, a solution is needed that allows selectively disabling legacy devices (e.g., CCIe-compatible devices) in a system in which a bus is shared by both legacy devices and next generation devices.

SUMMARY

A device is provided, comprising a bus (e.g., a two line bus), a first set of devices, and a second set of devices. The first set of devices may be coupled to the bus and configured to communicate over the bus according to a first communication protocol. The second set of devices may be coupled to the bus and configured to communicate over the bus according to both the first communication protocol and a second communication protocol. In a first mode of operation, the first set of devices and second set of devices concurrently communicate over the bus using the first communication protocol. In a second mode of operation, the second set of devices communicate with each other using the second communication protocol over the bus, and the first set of devices to stop operating on the bus. The first communication protocol may provide a first data throughput over the bus while the second communication protocol may provide a second data throughput over the bus, where the second data throughput is greater than the first data throughput. The first mode of operation signals may be transmitted over the two lines of the bus and a clock signal is embedded in symbol-to-symbol transitions of the plurality of symbols within the signals.

During the first mode of operation, at least one of the second set of devices may send a disable command or a sleep command over the bus to cause the first set of devices to stop operating on the bus. The disable command prevents each of the first set of devices from communicating over the bus until a power on reset or hardware reset of the first set of devices. The sleep command prevents each of the first set of devices from communicating over the bus until a wakeup command is received over the bus.

Prior to or concurrent with entering the second mode of operation, at least one device from the second set of devices may cause the first set of devices to enter a sleep or disabled mode. During the second mode of operation, the first set of devices are unaffected by bus activity. Each of the first set of devices may include a receiver device capable of at least partially decoding signals on the bus using just a clock signal embedded within signals transmitted according to the first communication protocol. The receiver device enters into a sleep mode or disabled mode upon receipt of a sleep command or disable command, respectively. If the receiver device is in sleep mode, the receiver device wakes up upon receipt of a wakeup command. If the receiver device is in a disabled mode, it cannot be woken-up by any command or sequence of signals, instead requiring a full power on reset of the device to make the receiver device operational again. Such disabled mode permits implementing other communication protocols over the bus that may be incompatible with first communication protocol.

A method is also provided comprising coupling a first set of devices to a bus (e.g., a two line bus), the first set of devices configured to communicate over the bus according to a first communication protocol. A second set of devices are also coupled to the bus, the second set of devices configured to communicate over the bus according to both the first communication protocol and a second communication protocol. In a first mode of operation, the first set of devices and second set of devices are configured to concurrently communicate over the bus using the first communication protocol. A disable command or a sleep command is then sent, from at least one of the second set of devices, over the bus during the first mode of operation to cause the first set of devices to stop operating on the bus. The first communication protocol may provide a first data throughput over the bus while the second communication protocol provides a second data throughput over the bus, where the second data throughput is greater than the first data throughput. The first mode of operation signals may be transmitted over the two lines and a clock signal is embedded in symbol-to-symbol transitions of the plurality of symbols within the signals. During the first mode of operation, at least one of the second set of devices sends a disable command or a sleep command over the bus to cause the first set of devices to stop operating on the bus. The disable command prevents each of the first set of devices from communicating over the bus until a power on reset or hardware reset of the first set of devices. The sleep command prevents each of the first set of devices from communicating over the bus until a wakeup command is received over the bus. Prior to or concurrent with entering the second mode of operation, at least one device from the second set of devices causes the first set of devices to enter a sleep or disabled mode. During the second mode of operation the first set of devices are unaffected by bus activity. The first communication protocol may be one of a camera control interface extended (CCIe) protocol or an I2C protocol.

Each of the first set of devices includes a receiver device capable of at least partially decoding signals on the bus using just a clock signal embedded within signals transmitted according to the first communication protocol. The receiver device enters into a sleep mode or disabled mode upon receipt of a sleep command or disable command, respectively. If the receiver device is in sleep mode, the receiver device wakes up upon receipt of a wakeup command. If the receiver device is in a disabled mode, it cannot be woken-up by any command or sequence of signals, instead requiring a full power on reset of the device to make the receiver device operational again.

According to yet another example, a device is provided comprising a communication circuit to couple to a bus (e.g., a two line bus), and a control circuit coupled to the communication circuit. The communication circuit may be configured to communicate over the bus according to a first communication protocol. The control circuit may be configured/adapted to: (a) configure the communication circuit to communicate over the bus using the first communication protocol, (b) monitor the bus for a sleep or disable command, and/or (c) reconfigure the communication circuit to ignore activity over the bus upon detection of a sleep or disable command.

The first communication protocol signals may be transmitted over the two lines and a clock signal is embedded in symbol-to-symbol transitions of the plurality of symbols within the signals. The sleep or disable command may cause the device to stop operating over the bus. The disable command may prevent the device from communicating over the bus until a power on reset or hardware reset of the device. The sleep command may prevent each of the device from communicating over the bus until a wakeup command is received over the bus. In one example, the communication circuit may include a receiver device configured to, at least partially, decode signals on the bus using just a clock signal embedded within signals transmitted according to the first communication protocol.

A method operational on a device is also provided, comprising: (a) configuring a communication circuit to communicate over a bus using a first communication protocol, (b) monitoring the bus for a sleep or disable command, (c) receiving the sleep or disable command over the bus from a second device capable of operating in a first mode of operation that uses the first communication protocol and in a second mode of operation that uses a second communication protocol, and/or (d) reconfiguring the communication circuit to ignore activity over the bus upon detection of a sleep or disable command.

In yet another example, a device is provided, comprising a communication circuit and a control circuit. The communication circuit may serve to couple to a bus shared with other devices. The control circuit may be coupled to the communication circuit and configured to: (a) configure the communication circuit to operate in a first mode in which a first communication protocol is used over the bus, (b) send a sleep or disable command over the bus to indicate to other devices that do not support a second communication protocol to ignore activity over the bus; and/or (c) reconfigure the communication circuit to operate in a second mode in which the second communication protocol is used over the bus.

In yet another example, a method operational on a device is provided, comprising: (a) configuring a communication circuit to operate in a first mode in which a first communication protocol is used over a bus; (b) sending a sleep or disable command over the bus to indicate to other devices that do not support a second communication protocol to ignore activity over the bus; and/or (c) reconfiguring the communication circuit to operate in a second mode in which the second communication protocol is used over the bus.

DRAWINGS

Various features, nature, and advantages may become apparent from the detailed description set forth below when taken in conjunction with the drawings in which like reference characters identify correspondingly throughout.

FIG. 20 illustrates a general example of converting a ternary number (base-3 number) to a binary number, where each T in {T11, T10, . . . T2, T1, T0} is a symbol transition number.

FIG. 21 illustrates an exemplary method for converting a binary number (bits) to a 12 digit ternary number (base-3 number).

FIG. 22 illustrates an example of one possible implementation of the division and the module operations of the FIG. 21, which may be synthesizable by any commercial synthesis tools.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

In a system in which next-generation devices and legacy devices share a bus, a feature is provided to permit the next-generation devices to selectively disable or sleep the legacy devices (or at least the bus interfaces of the legacy devices) in order to improve performance over the bus. A first set of devices (e.g., legacy devices, CCIe-compatible devices, etc.) may be configured to communicate over the bus according to a first communication protocol. A second set of devices (e.g., next-generation devices) may be configured to communicate over the bus according to both the first communication protocol and a second communication protocol. In a first mode of operation, the first set of devices and second set of devices may concurrently communicate over the bus using the first communication protocol. In a second mode of operation, the second set of devices communicate with each other using the second communication protocol over the bus, and the first set of devices stop operating over the bus. For instance, at least one device from the second set of devices may cause the first set of devices to enter a sleep or disabled mode and the second set of devices communicate with each other using the second communication protocol. Consequently, the first set of devices ignore activity (e.g., do not transmit and ignore most commands) over the bus during the second mode of operation).

In one example, the first communication protocol provides a first data throughput over the bus while the second communication protocol provides a second data throughput over the bus, where the second data throughput is generally greater than the first data throughput.

During the first mode of operation, at least one of the second set of devices sends a disable command or a sleep command over the bus to cause the first set of devices to stop operating on the bus.

Exemplary Operating Environment

Figure 1:
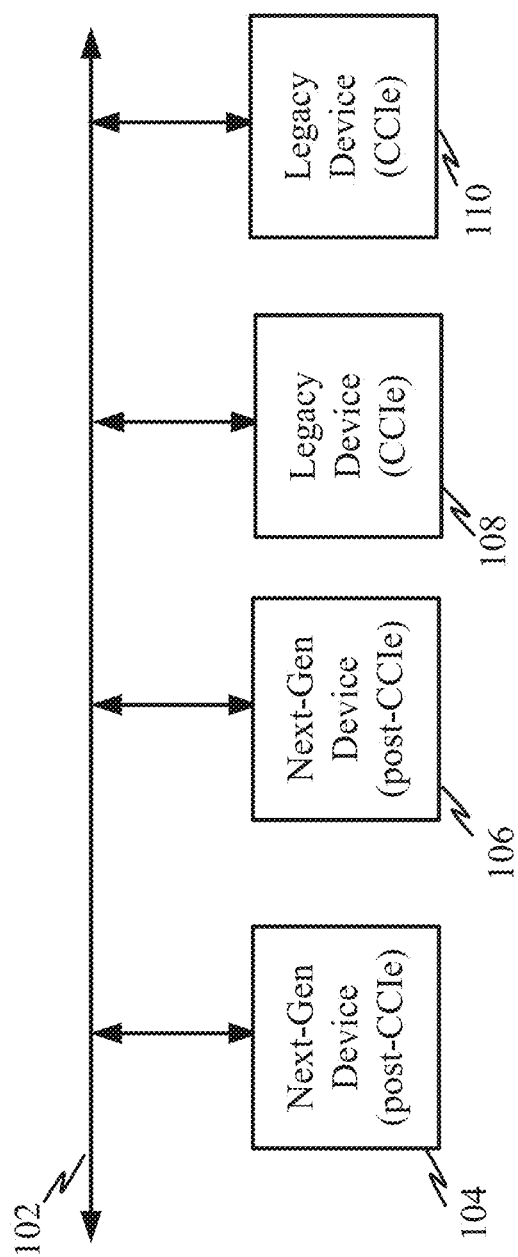
FIG. 1 is a block diagram illustrating an example of a bus shared by legacy devices and next-generation devices.

FIG. 1 is a block diagram illustrating an example of a bus 102 shared by legacy devices 108 and 110 and next-generation devices 104 and 106. In one example, the legacy devices 108 and 110 may be CCIe-compatible devices (or I2C-compatible devices) while the next-generation devices 104 and 106 may be post-CCIe devices. Such next-generation devices 104 and 106 may have improved performance or features relative to the legacy devices 108 and 110 (e.g., may operate faster, or include improved capabilities).

In some modes of operation, it may be desirable to share the bus 102 between the legacy devices 108 and 110 and next-generation devices 104 and 106 (e.g., for backward compatibility). In such modes of operation, the next-generation devices 104 and 106 may be operated at a reduced performance level in order to accommodate operation of the legacy devices 108 and 110.

In other modes of operation, it may be desirable to improve performance over the bus by disabling the legacy devices 108 and 110 (or at least the bus interfaces of the legacy devices), thereby permitting the next-generation devices 104 and 106 to operate to their full capabilities without concern for the legacy devices 108 and 110.

Figure 2:
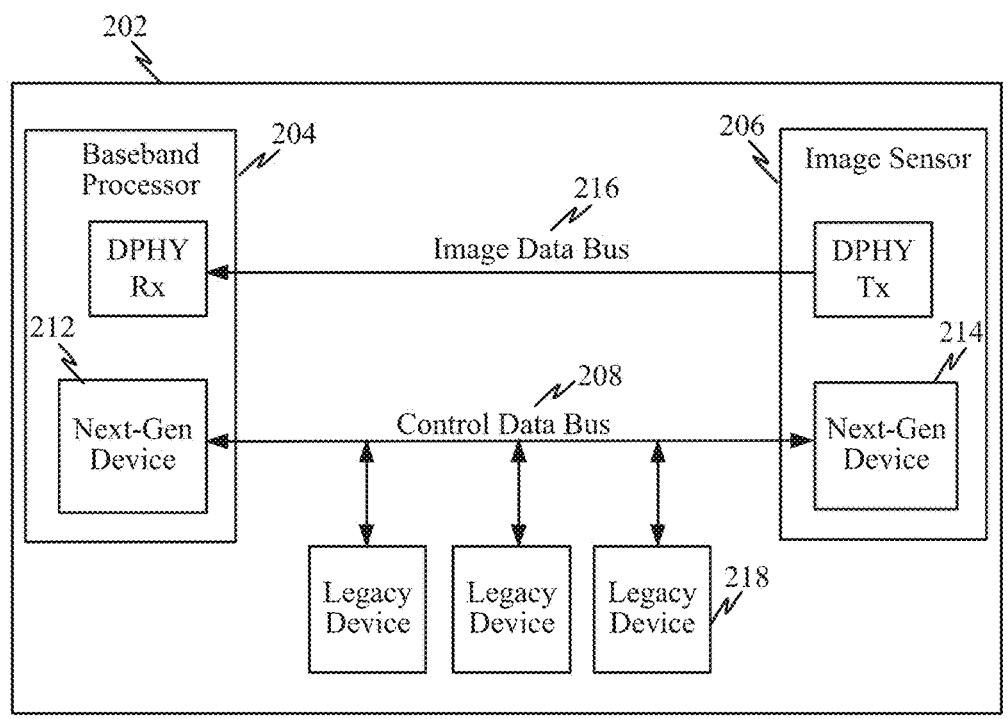
FIG. 2 is a block diagram illustrating a device having a baseband processor and an image sensor and implementing an image data bus and a multi-mode control data bus.

FIG. 2 is a block diagram illustrating a device 202 having a baseband processor 204 and an image sensor 206 and implementing an image data bus 216 and a multi-mode control data bus 208. The control data bus 208 may be implemented in various different devices and/or systems (e.g., camera, mobile phone, etc.). Image data may be sent from the image sensor 206 to the baseband processor 204 over an image data bus 216 (e.g., a high speed differential DPHY link). In one example, the control data bus 208 may comprise two wires, for example, a clock line (SCL) and a serial data line (SDA). The clock line SCL may be used to synchronize all data transfers over the control data bus 208. The data line SDA and clock line SCL are coupled to all devices 212, 214, and 218 on the control data bus 208. In this example, control data may be exchanged between the baseband processor 204 and the image sensor 206 as well as other peripheral devices 218 via the control data bus 208.

In one example, the control data bus 208 may be shared (e.g., concurrently used) by one or more legacy devices 218 (e.g., CCIe-compatible devices or I2C-compatible devices) as well as next generation devices 212 and 214 (e.g., post-CCIe devices).

In this example, a first next generation device 212 in the baseband processor 204 may operate as a master device/node and a second next generation device 214 in the image sensor 206 may operate as a slave device/node.

According to one aspect, a first mode of operation may be implemented over the multi-mode control data bus 208 to support the concurrent operation of the next-generation devices 212 and 214 and the legacy devices 218. In this first mode of operation, the next-generation devices 212 and 214 may operate at a reduced level of performance in order to accommodate the legacy devices 218. In a second mode of operation, the legacy devices 218 may be disabled so that the next-generation devices 212 and 214 may operate at according to their full capabilities or level of performance.

To achieve disabling the legacy devices 218, a mechanism is provided that allows the next-generation devices 212 and 214 to disable the legacy devices 218 via commands issued over the shared bus 208. This may allow the next-generation devices 212 and 214 to operate at the full capabilities (e.g., faster transmission speeds, increased bandwidth, etc.) than may be possible when the legacy devices 218 are operating on the shared bus 102 and 208.

Figure 3:
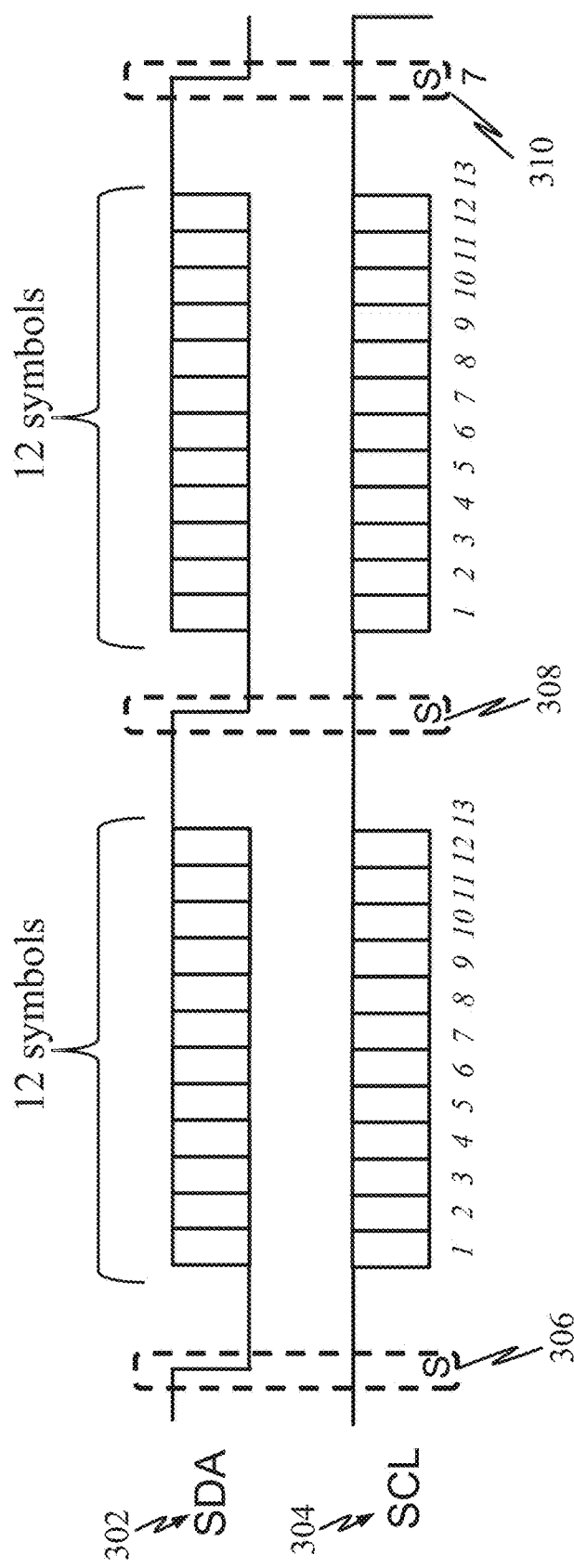
FIG. 3 illustrates how both wires/lines of a shared bus may be utilized for data transmission in CCIe mode.

FIG. 3 illustrates how both wires/lines of a shared bus may be utilized for data transmission in CCIe mode. For instance, shared bus 102 or 208 may include a first line (SDA) 302 and a second line (SCL) 304. In one implementation, a clock signal may be embedded within symbol transitions (as discussed further below). The SDA line 302 and SCL line 304 can each transmit any arbitrary 12 symbols between two consecutive START conditions 306, 308 and 310 from the legacy devices (e.g., CCIe-capable nodes).

Any CCIe words may be sent in 12-symbols that carry 20-bits information. Sixteen (16) bits of the 20-bits may be for data information while 4 bits of the 20-bits may be used for other information such as control information.

Exemplary Approach to Disable Legacy (CCIe) Devices

Figure 4:
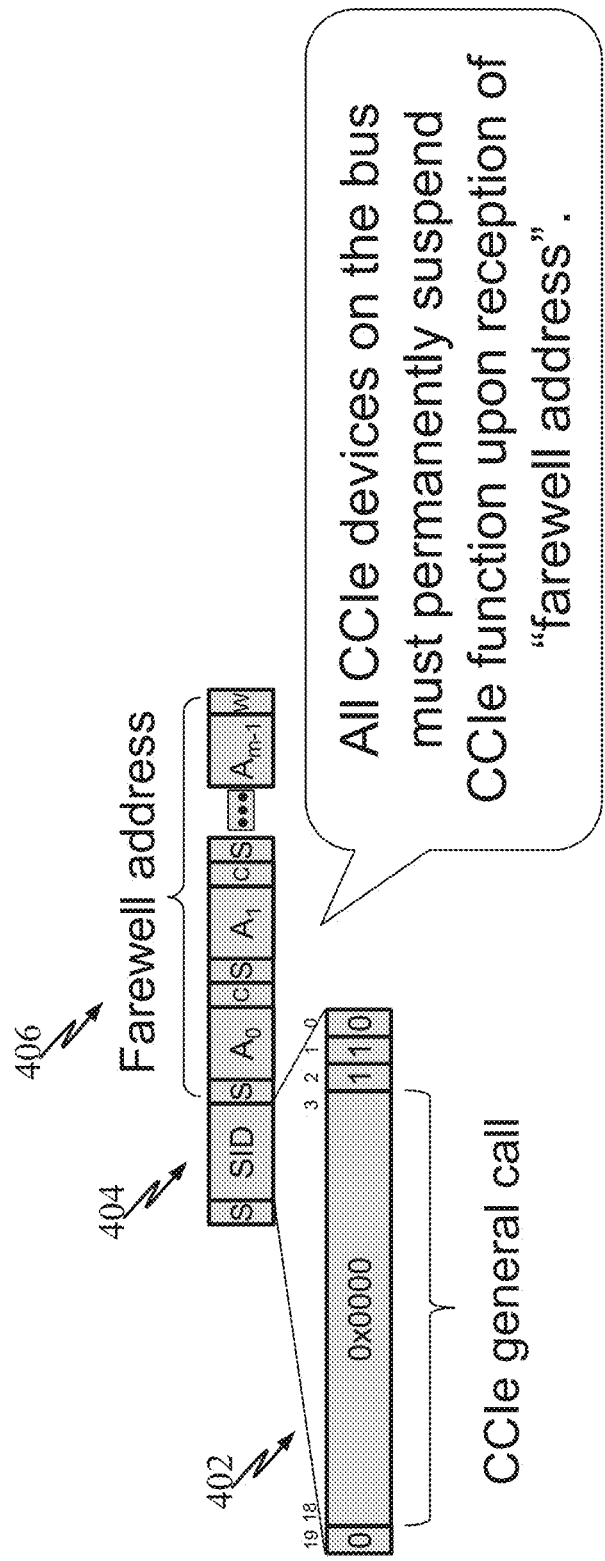
FIG. 4 illustrates an exemplary general call that may be used to place the legacy (CCIe) devices into a disable mode.

FIG. 4 illustrates an exemplary general call that may be used to place the legacy (CCIe) devices (or at least their interface to the bus) into a disable mode (e.g., suspend, stop, or kill mode so legacy devices do not wakeup). That is, such disable mode may be used when the legacy devices will not be subsequently awoken (except through a power reset or a reboot). For instance, a next-generation device 212 or 214 may send a farewell/disable command/call 402 over the shared bus 102 or 208 which causes the legacy devices 218 to become disabled until a power reset occurs. The farewell/disable command/call 402 may include an address portion 406 that is specifically selected to disable the legacy (CCIe) devices. The specific address 406 used in the SID field 404 is selected so that no legacy device accidentally interprets it as valid address. Instead, such farewell address is interpreted and processed as a farewell/disable command/call by the legacy devices. The farewell address may be a compact and simple code to avoid large hardware overhead when decoding at the legacy devices.

The farewell/disable command/call 402 may be sent, for example, by a master device (e.g., a next-generation device operating as a master for communications over the shared bus). When receiving such farewell/disable command/call 402, next-generation devices may be configured to switch to a different mode (e.g., a mode in which the next-generation devices operate according a different communication protocol, transmit speed, etc.). For example, upon receipt of the farewell/disable command/call 402, next-generation devices may change their input/output specifications (e.g. input/output level, slew-rate, etc.).

Exemplary Approach to Place Legacy (CCIe) Devices into Sleep Mode

Figure 5:
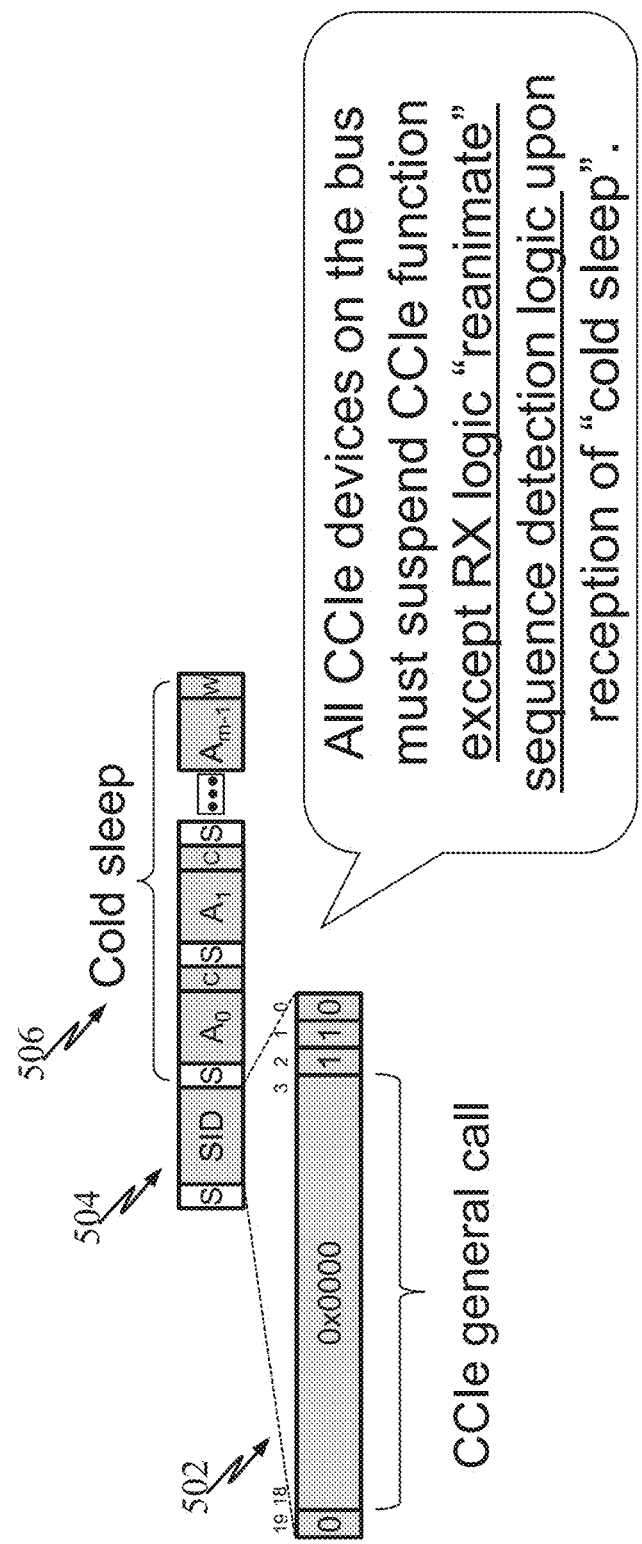
FIG. 5 illustrates an exemplary general call that may be used to place the legacy (CCIe) devices into a sleep mode.

FIG. 5 illustrates an exemplary general call that may be used to place the legacy (CCIe) devices (or at least their interface to the bus) into a sleep mode. Sleep mode permits placing legacy (CCIe) devices into temporary sleep from which they may be awakened (by another command) without the need for a power reset.

A next-generation device 212 or 214 may send a sleep command/call 502 over the shared bus 102 or 208 which causes the legacy devices 218 to enter a sleep mode. In such sleep mode, the legacy devices 218 may be dormant (e.g., do not respond to communications over the shared bus) but the receivers in the legacy devices may monitor the bus for a wakeup command/call. The sleep command/call 502 may include an address portion 506 that is specifically selected to disable the legacy (CCIe) devices. The specific address 506 used in the SID field 504 is selected so that no legacy device accidentally interprets it as valid address. Instead, such sleep address 506 is interpreted and processed as a sleep command/call by the legacy devices. The sleep address may be a compact and simple code to avoid large hardware overhead when decoding at the legacy devices.

The sleep command/call 502 may be sent, for example, by a master device (e.g., a next-generation device operating as a master for communications over the shared bus). When receiving such sleep command/call 502, next-generation devices may be configured to switch to a different mode (e.g., a mode in which the next-generation devices operate according a different communication protocol, transmit speed, etc.). For example, upon the receipt of the sleep command/call 502, next-generation devices may modify their interfaces to the bus and/or change their input/output specifications (e.g. input/output level, slew-rate, etc.).

Similarly, a wakeup command/call may be sent by a next-generation device to reanimate or wake-up the legacy devices. Such wakeup command/call may be designed to cause a receiver of the legacy device to wakeup the legacy device. Occurrence of such wakeup call may also cause the next-generation devices to switch to an operating mode that permits coexistence with the legacy devices over the shared bus.

Figure 6:
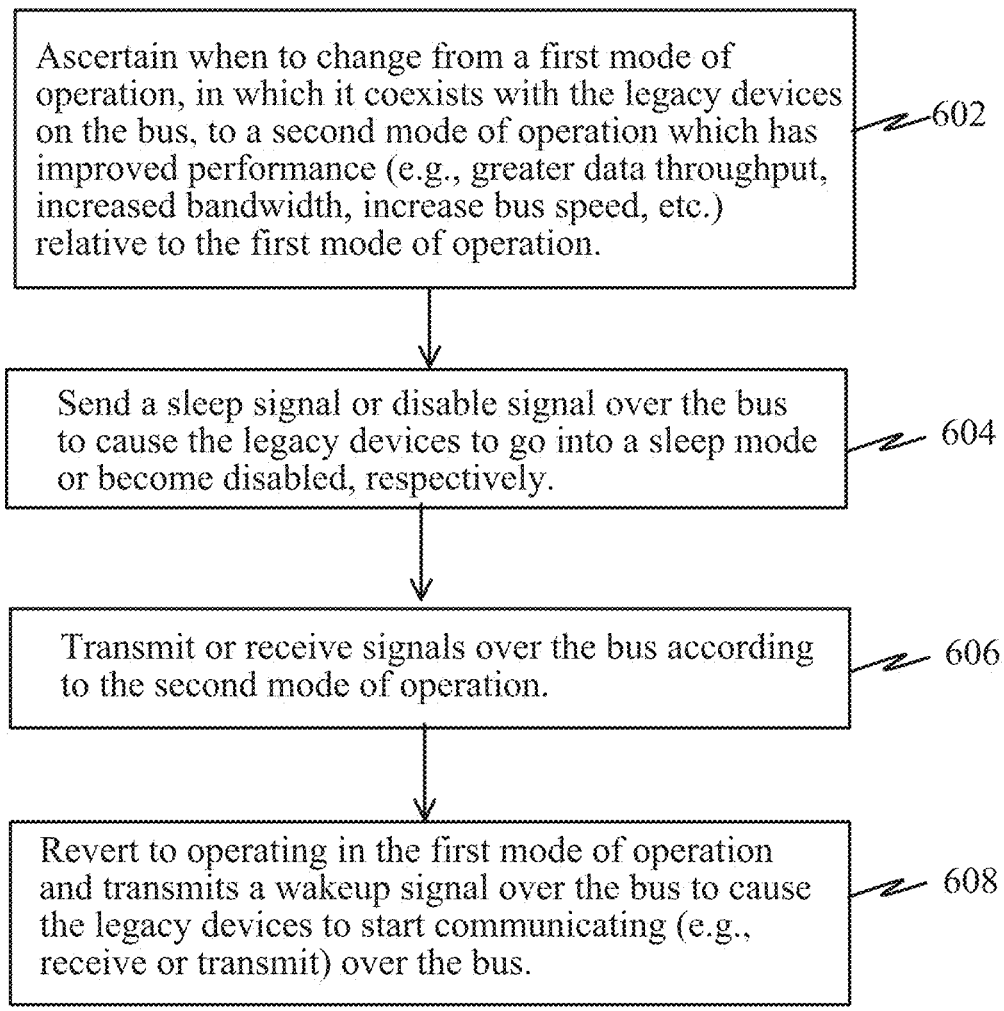
FIG. 6 illustrates a method operational at a next generation device to disable/sleep legacy devices (e.g., CCIe-compatible devices) sharing the same bus.

FIG. 6 illustrates a method operational at a next generation device to disable/sleep legacy devices (e.g., CCIe-compatible devices) sharing the same bus. The next generation device may ascertain when to change from a first mode of operation, in which it coexists with the legacy devices on the bus, to a second mode of operation which has improved performance (e.g., greater data throughput, increased bandwidth, increase bus speed, etc.) relative to the first mode of operation 602. The next generation device may then send a sleep command or disable command over the bus to cause the legacy devices to go into a sleep mode or become disabled, respectively 604. In sleep mode or disabled mode, the legacy devices may ignore most or all transmissions over the bus, with the exception of a wakeup command. The next generation device may then transmit or receive signals over the bus according to the second mode of operation 606. In some instances, the next generation device may revert to operating in the first mode of operation and transmits a wakeup command over the bus to cause the legacy devices to start communicating (e.g., receive or transmit) over the bus 608.

Figure 7:
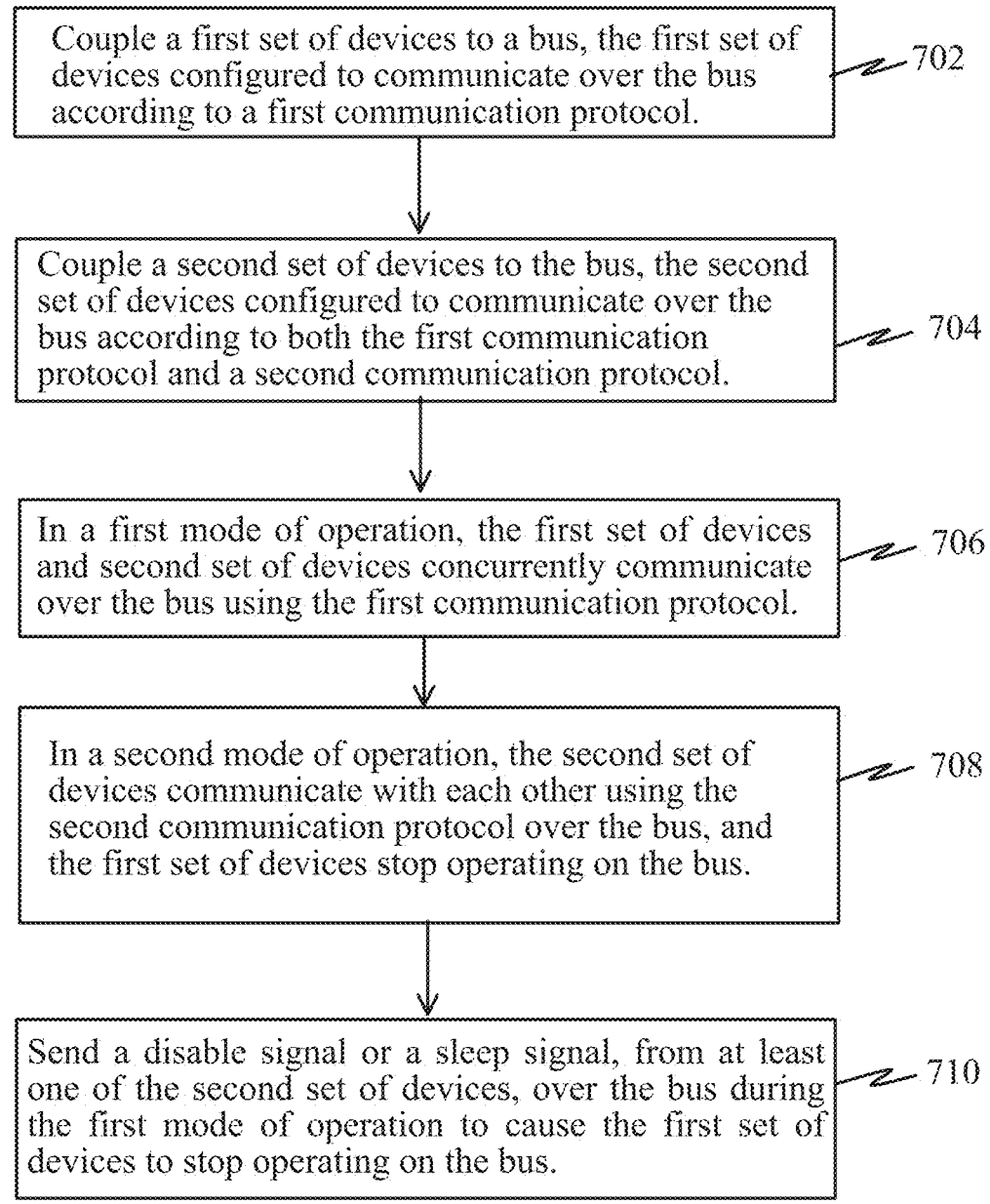
FIG. 7 illustrates a method that permits a next generation device to disable/sleep legacy devices sharing the same bus.

FIG. 7 illustrates a method that permits a next generation device to disable/sleep legacy devices sharing the same bus. A first set of devices (e.g., legacy devices) may be coupled to a bus, the first set of devices configured to communicate over the bus according to a first communication protocol 702. A second set of devices (e.g., next generation devices) may be coupled to the bus, the second set of devices configured to communicate over the bus according to both the first communication protocol and a second communication protocol 704. In a first mode of operation, the first set of devices and second set of devices may concurrently communicate over the bus using the first communication protocol 706. In a second mode of operation the second set of devices communicate with each other using the second communication protocol over the bus, and the first set of devices stop operating (e.g., receiving and/or transmitting) on the bus 708.

That is, during the second mode of operation the first set of devices are unaffected by bus activity (e.g., ignore all or most transmissions on the bus and/or do not transmit over the bus). For example, prior to or concurrent with entering the second mode of operation, at least one device from the second set of devices may cause the first set of devices to enter a sleep or disabled mode. For instance, a disable command or a sleep command may be sent from at least one of the second set of devices over the bus during the first mode of operation to cause the first set of devices to stop operating on the bus 710.

The first communication protocol provides a first data throughput over the bus while the second communication protocol provides a second data throughput over the bus, where the second data throughput is greater than the first data throughput.

In one example, the bus may include two lines. In the first mode of operation, signals may be transmitted over the two lines and a clock signal may be embedded in symbol-to-symbol transitions of the plurality of symbols within the signals.

During the first mode of operation, at least one of the second set of devices sends a disable command or a sleep command over the bus to cause the first set of devices to stop from operating (or communicating) on the bus.

The disable command prevents each of the first set of devices from communicating over the bus until a power on reset or hardware reset of the first set of devices. For example, this may be accomplished by preventing the bus interface for a device (within the first set of devices) from receiving and/or transmitting over the bus. In another example, the disable command may disable operation of each device within the first set of devices.

The sleep command may prevent each of the first set of devices from communicating over the bus until a wakeup command is received over the bus. For example, this may be accomplished by preventing the bus interface for a device (within the first set of devices) from receiving and/or transmitting over the bus. In another example, the sleep command may place each device within the first set of devices into a sleep mode.

Each of the first set of devices includes a receiver device capable of at least partially decoding signals on the bus using just a clock signal embedded within signals transmitted according to the first communication protocol. The receiver device may enter into a sleep mode or disabled mode upon receipt of a sleep command or disable command, respectively. The receiver device may wakeup upon receipt of a wakeup command.

The first communication protocol may be, for example, one of a camera control interface extended (CCIe) protocol or an I2C protocol.

Exemplary Transcoding Technique for Legacy (CCIe) Devices

In order to implement the sleep/wakeup modes described above, a mechanism is needed that permits the legacy (CCIe) devices to receive either the sleep command/call and/or the wakeup command/call while the legacy device is sleeping (e.g., not operating). This may be accomplished by having a receiver device within the legacy device that is capable of receiving transmitted signals from the shared bus without then need for a receiver clock.

Figure 8:
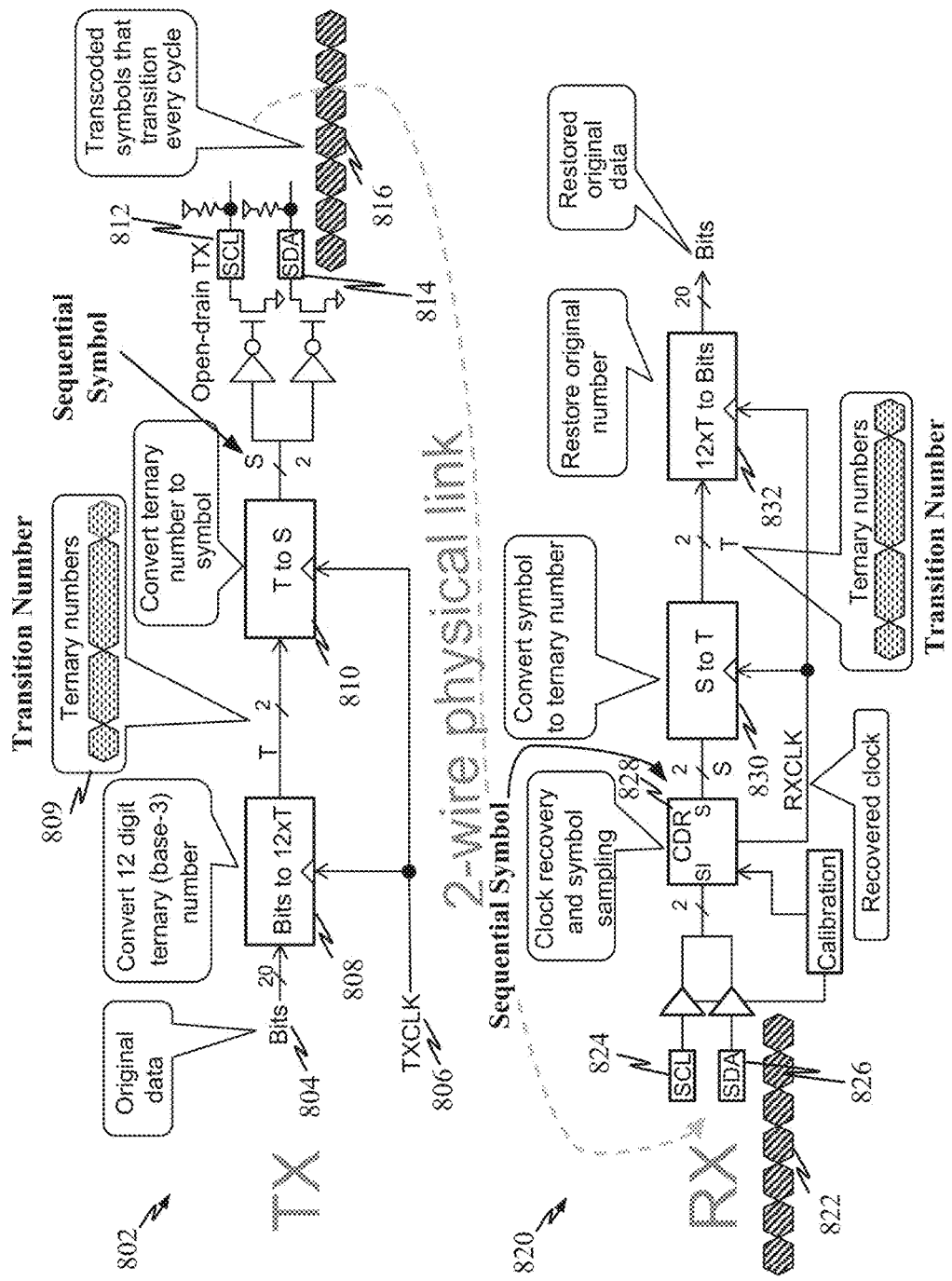
FIG. 8 is a block diagram illustrating an exemplary method for transcoding of data bits into transcoded symbols at a transmitter to embed a clock signal within the transcoded symbols.

FIG. 8 is a block diagram illustrating an exemplary method for transcoding of data bits into sequential symbols at a transmitter to embed a clock signal within the sequential symbols. At the transmitter 802, a sequence of data bits 804 are converted into a ternary (base 3) number (e.g., where each individual digit of the ternary number is referred to as a "transition number"), and the ternary numbers are converted into sequential symbols which are transmitted over a control data bus that includes a clock line SCL 812 and a data line SDA 814.

In one example, an original 20-bits 804 of binary data is input to a bit-to-transition number converter block 808 to be converted to a 12-digits ternary number 809. Each digit of a 12-digits ternary number may represent a "transition number". Two consecutive digits of a transition number may be the same digit value. Each digit of a transition number is converted into a sequential symbol at a transition-to-symbol block 810 such that no two consecutive sequential symbols have the same value. Because a transition (e.g., change) is guaranteed at every sequential symbol, such sequential symbol transition may serve to embed a clock signal. Each sequential symbol 816 is then sent over a two wire physical link (e.g., I2C control data bus comprising a SCL line 812 and a SDA line 814).

At a receiver 820 the process is reversed to convert the sequential symbols back to bits and, in the process, a clock signal is extracted from the sequential symbol transition. The receiver 820 receives the sequential symbols 822 over the two wire physical link (e.g., an I2C control data bus comprising a SCL line 824 and a SDA line 826). The received sequential symbols 822 are input into a clock-data recovery (CDR) block 828 to recover a clock timing and sample the sequential symbols (S). A symbol-to-transition number converter block 830 then converts each sequential symbol to a transition number, where each transition number represents a digit of a ternary number. Then, a transition number-to-bits converter 832 converts twelve (12) transition numbers (i.e., a ternary number) to restore twenty (20) bits of original data from the 12 digit ternary number.

Figure 10:
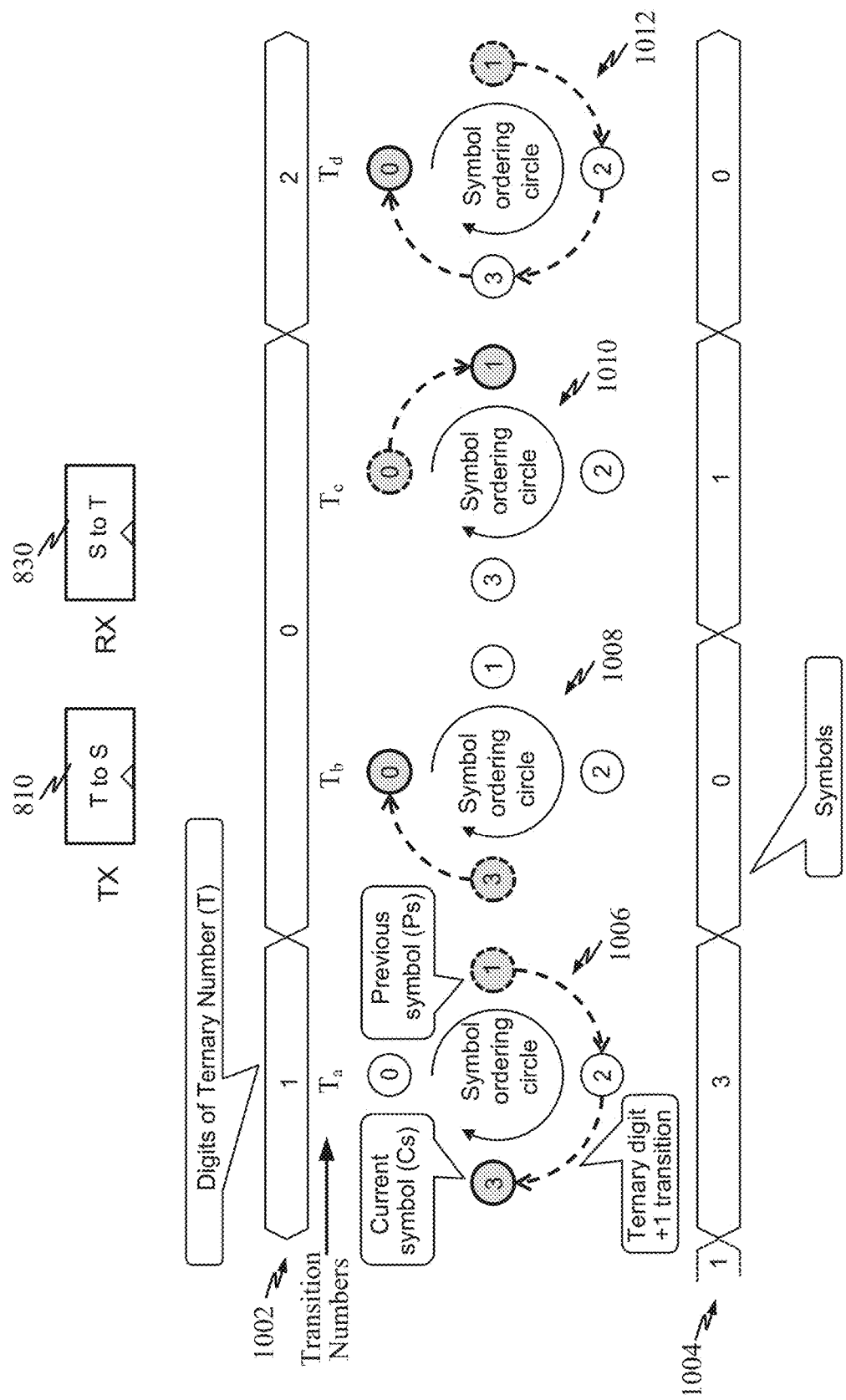
FIG. 10 illustrates one example of converting between ternary numbers (transition number) and (sequential) symbols.

The technique illustrated herein may be used to increase the link rate of a control data bus 102 (FIG. 1) and 208 (FIG. 2) beyond what the I2C standard control data bus provides and is referred hereto as CCIe mode. In one example, a master node/device and/or a slave node/device coupled to the control data bus 102 and 208 may implement transmitters and/or receivers that embed a clock signal within sequential symbol changes/transitions (as illustrated in FIG. 10) in order to achieve higher bit rates over the same control data bus than is possible using a standard I2C control data bus.

Figure 9:
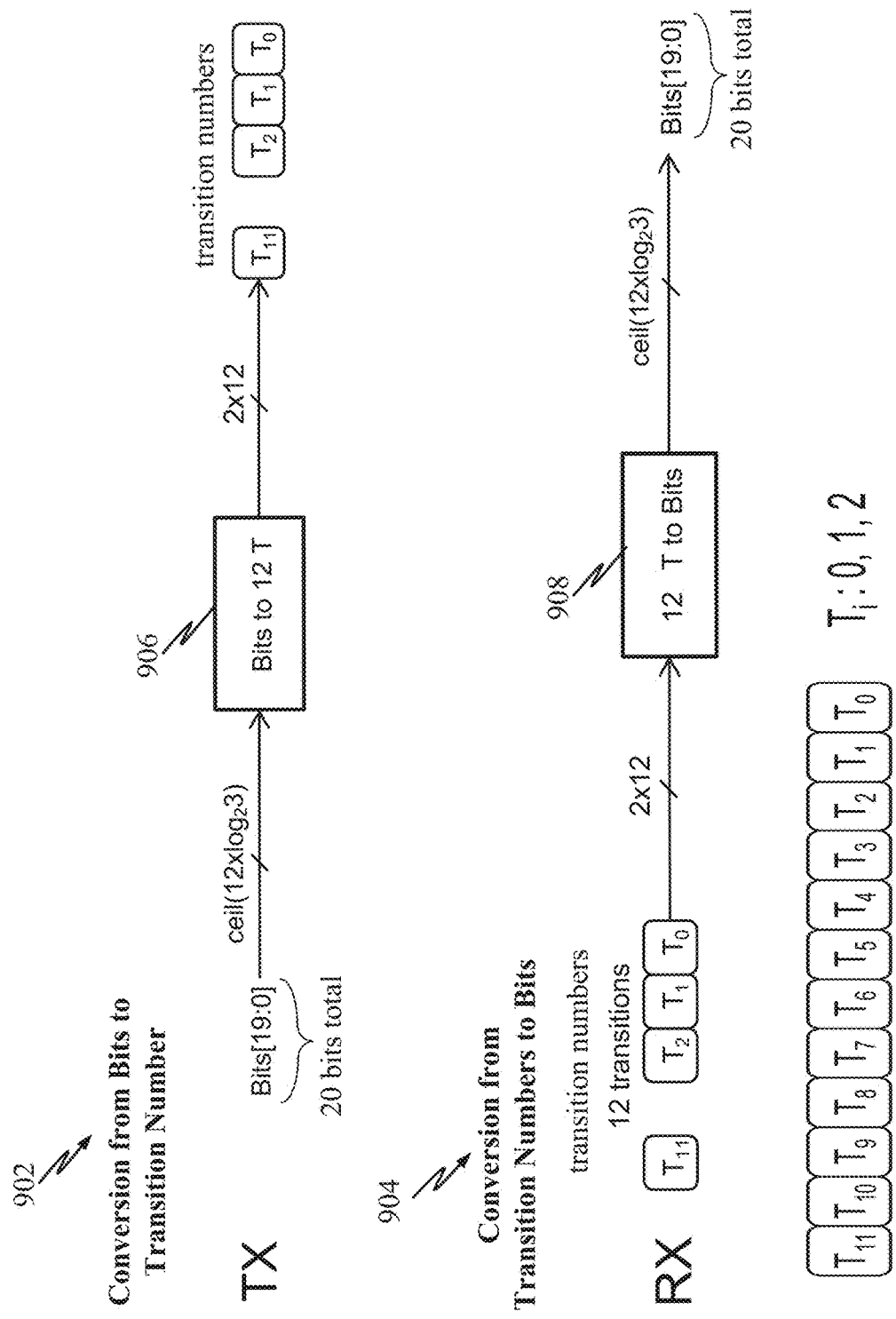
FIG. 9 illustrates an exemplary conversion from bits to transition numbers at a transmitter and then from transition numbers to bits at a receiver.

FIG. 9 illustrates an exemplary conversion from bits to transition numbers at a transmitter 902 and then from transition numbers to bits at a receiver 904. This example illustrates the transmission for a 2-wire system using 12 transition symbols. The transmitter 902 feeds binary information, Bits, into a "Bits to 12×T" converter 906 to generate 12 symbol transition numbers, T0 to T11. The receiver 904 receives 12 symbols transition numbers, T0 to T11, which are fed into a "12×T to Bits" converter 908 to retrieve the binary information (Bits). If there are r possible symbol transition states per one T, T0 to T11, 12 transitions can send $r^{12}$ different states. For a 2-wire bus, $r=2^2-1$. Consequently, transitions T0 ... T11 contain data that can have $(2^2-1)^{12}$ different states. Consequently, r=4−1=3 and the number of states=(4−1)^12=531441.

In this example for a 2-wire system using 12 symbol transition numbers, it may be assumed that the possible symbol transitions per one T, r is 3 ($=2^2-1$). If the number of symbols in a group is 12, a 12-digit ternary number (base-3 number): T11, T10, ..., T2, T1, T0, where each Ti: 0, 1, 2, may be used. For example, for {T11, T10, ... T2, T1, T0}={2, 1, 0, 0, 1, 1, 0, 1, 0, 1, 2, 1}, the ternary number is:

$2100\_1101\_0121_3$ (Ternary number)$=2\times3^{11}+1\times3^{10}+0\times3^9+0\times3^8+1\times3^7+1\times3^6+0\times3^5+1\times3^4+0\times3^3+1\times3^2+2\times3^1+1\times3^0=416356$ (0x65A64).

In this manner, 12 transitions numbers may be converted into a number. Note that the ternary number $2100\_1101\_0121_3$ may be used as the transition number, for example, in FIG. 8, so that each integer may be mapped to a sequential symbol and vice versa. When sending $2100\_1101\_0121_3$ in inverse order, the Ts are sent in decreasing order of power, i.e., T11 is the digit to be multiplied by $3^{11}$ so it is of the eleventh power and so forth.

The example illustrated in FIG. 8 for a 2-wire system and 12 symbol transition numbers may be generalized to an n-wire system and m symbol transition numbers. If there are r possible symbol transition states per one T, T0 to Tm−1, m transitions can send $r^m$ different states, i.e., $r=2^n-1$. Consequently, transitions T0 ... Tm−1 contain data that can have $(2^n-1)^m$ different states.

FIG. 10 illustrates an exemplary conversion between transition numbers 1002 and sequential symbols 1004. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

In one example, the conversion function adds the transition number (e.g., digit of a ternary number) plus 1 to the previous raw sequential symbol value. If the addition results in a number larger than 3, it rolls over from 0, then the result becomes the state number or value for the current sequential symbol.

In a first cycle 1006, a previous sequential symbol (Ps) is 1 when a first transition number ($T_a$) 1 is input, so the first transition number 1 plus 1 is added to the previous sequential symbol (Ps), and the resulting current sequential symbol (Cs) of 3 becomes the current sequential symbol that is sent to the physical link.

In a second (next) cycle 1008, a second transition number ($T_b$) of 0 is input, and the second transition number 0 plus 1 is added to the previous sequential symbol (Ps) of 3. Since the result of the addition (0+1+3) equals 4, is larger than 3, the rolled over number 0 becomes the current sequential symbol (Cs).

In a third cycle 1010, a third transition number ($T_c$) of 0 is input. The conversion logic adds the third transition number 0 plus 1 to the previous sequential symbol (Ps) 0 to generate current sequential symbol (Cs) 1.

In a fourth cycle 1012, a fourth transition number ($T_d$) of 2 is input. The conversion logic adds the fourth transition number ($T_d$) 2 plus 1 to the previous symbol (Ps) 1 to generate current sequential symbol (Cs) 0 (since the result of the addition, 4, is larger than 3, the rolled over number 0 becomes the current sequential symbol).

Consequently, even if two consecutive ternary digits $T_b$ and $T_c$ have the same number, this conversion guarantees that two consecutive sequential symbols have different state values. Because of this conversion, the guaranteed sequential symbol change or transition in the sequence of symbols 1004 may serve to embed a clock signal, thereby freeing the clock line SCL in an I2C control data bus for data transmissions.

Note that while this example of transition number to sequential number conversions adds a guaranteed number "1" to increment between consecutive sequential symbols, other values may be used in other implementations to guarantee a transition or change between sequential symbols.

Referring again to FIG. 8, at the receiver 820 the process illustrated in FIG. 10 is reversed to convert the sequential symbols back to bits and, in the process, a clock signal is extracted from the symbol transition. The receiver 820 receives sequential symbols 822 over the two wire physical link (e.g., I2C bus comprising a SCL line 824 and a SDA line 826). The received sequential symbols 422 are input into a clock-data recovery (CDR) block 828 to recover a clock timing and sample the transcoded symbols (S). A symbol-to-transition number converter block 830 then converts each sequential symbol to a transition number, i.e., which makes up a digit within a ternary number. Then, a transition number-to-bits converter 32 converts 12 transition numbers (i.e., a ternary number) to restore 20 bits of original data from the 12 digit ternary number.

Figure 11:
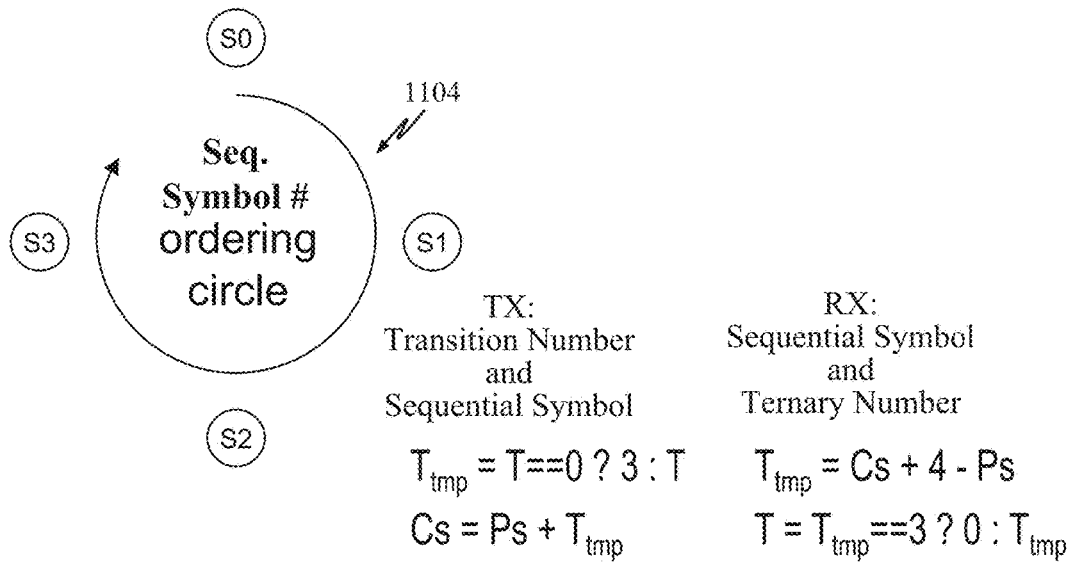
FIG. 11 illustrates the conversion between sequential symbols and transition numbers.

FIG. 11 illustrates the conversion between sequential symbols and transition numbers. This conversion maps each transition from a previous sequential symbol number (Ps) to a current sequential symbol (Cs) to a transition number (T). At the transmitter device, the transition numbers are being converted to sequential symbols. Because of the relative conversion scheme being used, the transition numbers guarantee that no two consecutive sequential symbols 1104 will be the same.

In one example for a 2-wire system, there are 4 raw symbols assigned to 4 sequential symbol S0, S1, S2, and S3. For the 4 sequential symbols, Table 1102 illustrates how a current sequential symbol (Cs) may be assigned based on a previous sequential symbol (Ps) and a temporary transition number $T_{tmp}$ based upon the current transition number (T).

In this example, the transition number $C_s$ may be assigned according to:

$$Cs=Ps+T_{tmp}$$

where $T_{tmp}$=T==0 ?3:T. Alternatively stated, if the current transition number T is equal to zero, the temporary transition number $T_{tmp}$ becomes 3, else $T_{tmp}$ becomes equal to T. And once $T_{tmp}$ is calculated, Cs is set to Ps plus $T_{tmp}$. Moreover, on the receiver end, the logic is reversed to recover T, $T_{tmp}=C_s+4-P_s$ and $T=T_{tmp}==3?0:T_{tmp}$.

FIG. 20 illustrates a general example of converting a ternary number (base-3 number) to a binary number, where each T in {T11, T10, . . . T2, T1, T0} is a symbol transition number.

FIG. 21 illustrates an exemplary method for converting a binary number (bits) to a 12 digit ternary number (base-3 number). Each digit can be calculated by dividing the remainder (result of a modulo operation) from a higher digit calculation with 3 to the power of the digit number, discarding decimal points numbers.

FIG. 22 illustrates an example of one possible implementation of the division and the module operations of the FIG. 21, which may be synthesizable by any commercial synthesis tools.

Exemplary Embedded Receiver Clock

Figure 12:
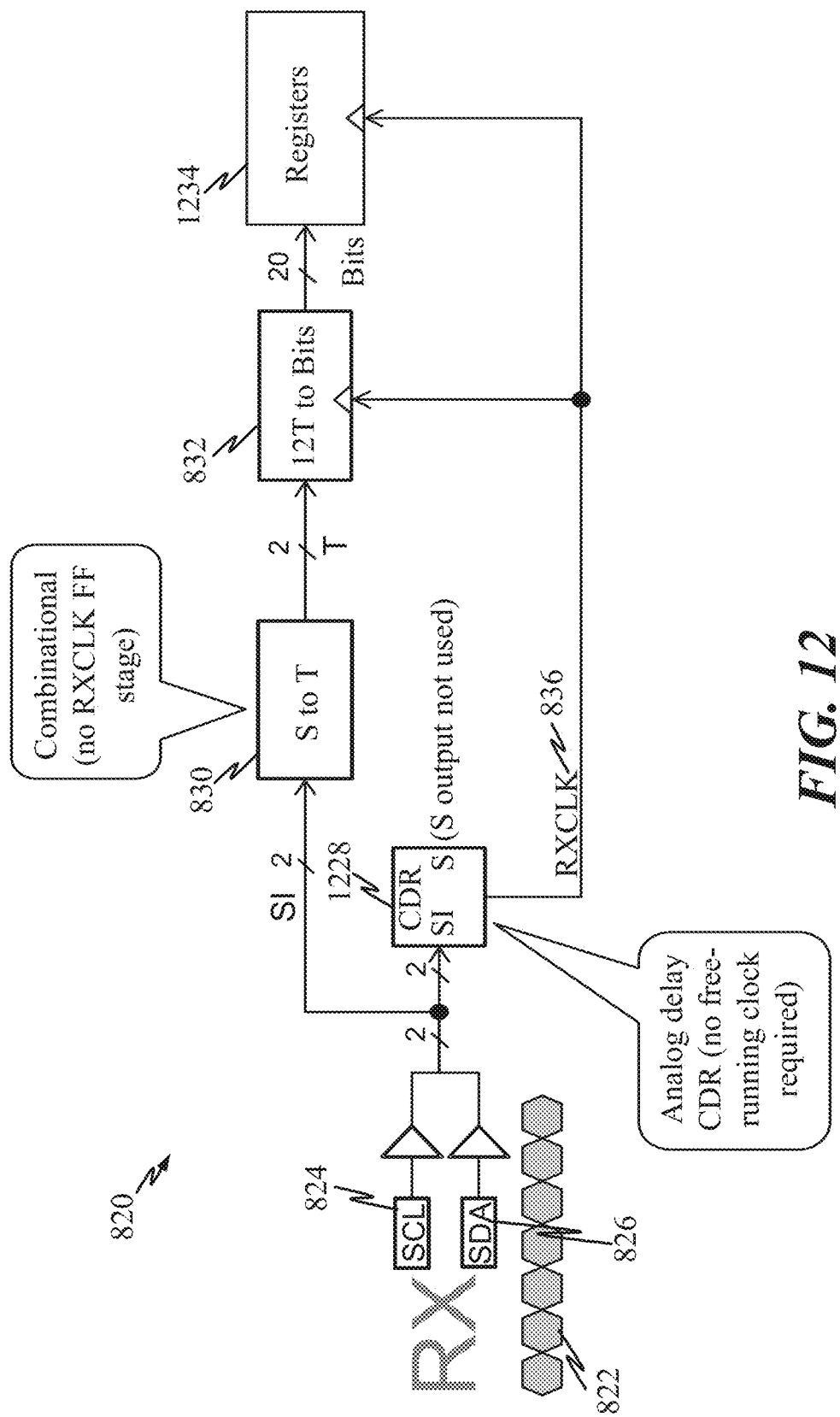
FIG. 12 illustrates the receiver that is configured to write data received over a shared bus to registers using only a clock recovered from the received data (i.e., no free-running clock is required).

FIG. 12 illustrates an example of the receiver 820 that is configured to write data received over a shared bus (lines 824 and 826 in FIG. 8) to registers 1234 using only a clock recovered from the received data (i.e., no free-running clock is required). A problem exists in attempting to write the received data into registers using only n clock cycles available from the embedded clock. That is, while a clock may be extracted from symbol-to-symbol transitions within the received transmission, an extra clock cycle is needed after the final symbol-to-symbol transition to write the extracted bits into registers for storage. This may be accomplished by having a free-running clock which is undesirable since the master device would need to make sure that the slave device is awake prior to transmission. Alternatively, an analog delay may be introduced as part of the clock extraction circuit. However, under certain conditions (illustrated in FIG. 8) the extracted clock is insufficient to both receive the transmitted data and write it to registers.

Figure 13:
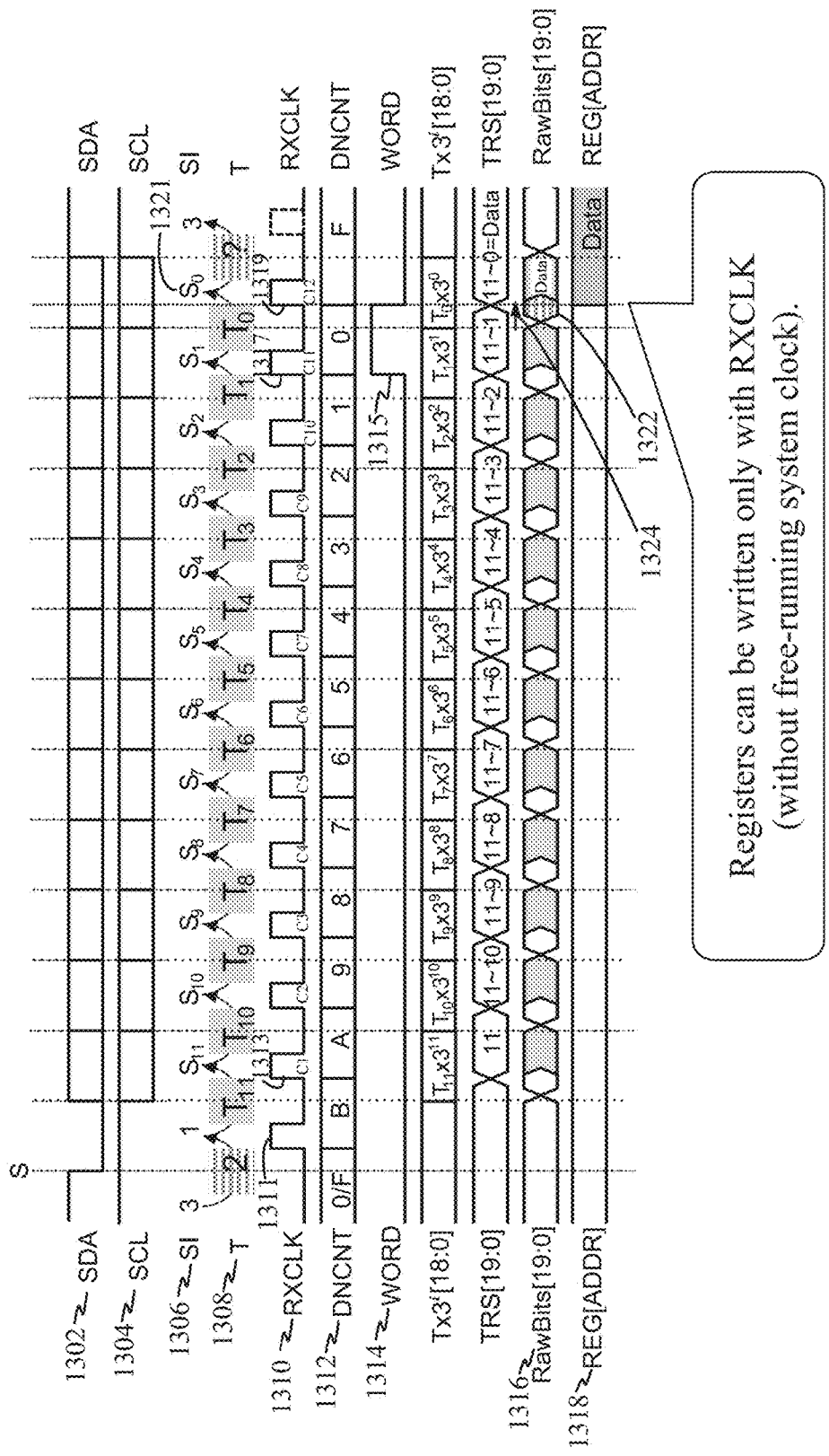
FIG. 13 is a timing diagram illustrating the reception of data encoded within symbols, the recovery of a clock from the symbol transitions, as well as a timing of generated signals used to complete a write operation of the received data to registers using only the recovered clock.

FIG. 13 is a timing diagram illustrating the reception of data encoded within symbols, the recovery of a clock from the symbol transitions, as well as a timing of generated signals used to complete a write operation of the received data to registers using only the recovered clock. Preceded by a start indicator S, a sequence of symbols 1306 is transmitted through a two-line bus 1302 and 1304. A sequence of symbols 1306 and transitions 1308 between symbols is illustrated. A receiver clock 1310 is extracted from the symbol-to-symbol transitions 1308. An initial clock 1311 corresponds to the start indicator S (e.g., also known as a "Start Condition" in the I2C Specification). A plurality of clocks C1, C2, . . . , C12 may be extracted from the transitions (T11, T10, T9 . . . T0) between consecutive symbols S11, S10, S9, . . . , S0 since no two same sequential symbols repeat.

In this example, a down counter (DNCNT) 1312 is used for counting down twelve (12) cycles (each cycle from a low-to-high transition to a low-to-high transition of the receiver clock RXCLK 1310), starting from when the first clock cycle 1313 is detected until a last cycle 1319. When the down counter DNCNT 1312 reaches 0x0 hex, a word marker 1315 is triggered on a word line 1314.

After a penultimate clock cycle C11 1317 but before the last clock cycle C12 1319 (e.g., during a time period 1324), a final or last symbol S0 1321 is received and combined with the remaining symbols S11 . . . S1 so that the raw bits 1322 are available when the last clock cycle C12 1319 occurs. Note that, it is only after reception of the last symbol (e.g., twelfth symbol S0) that the original bits can be decoded to obtain the raw bit data 1322. A last clock cycle C12 1319 is then used to store the data 1322 (or portion thereof) into registers. This allows receiving, decoding, and storing the data 1322 solely using the embedded clock (e.g., clock recovered from symbol-to-symbol transitions) and without use of an external or free-running clock at the receiver (slave) device. Note that this is done without the need to pad or insert extra symbols or bits.

In one example, the number of symbols received is twelve. The twelve symbols may encode twenty bits of information (e.g., including sixteen (16) data bits and four (4) control bits). In other examples, different number of symbols may be used to encode different number of bits.

Figure 14:
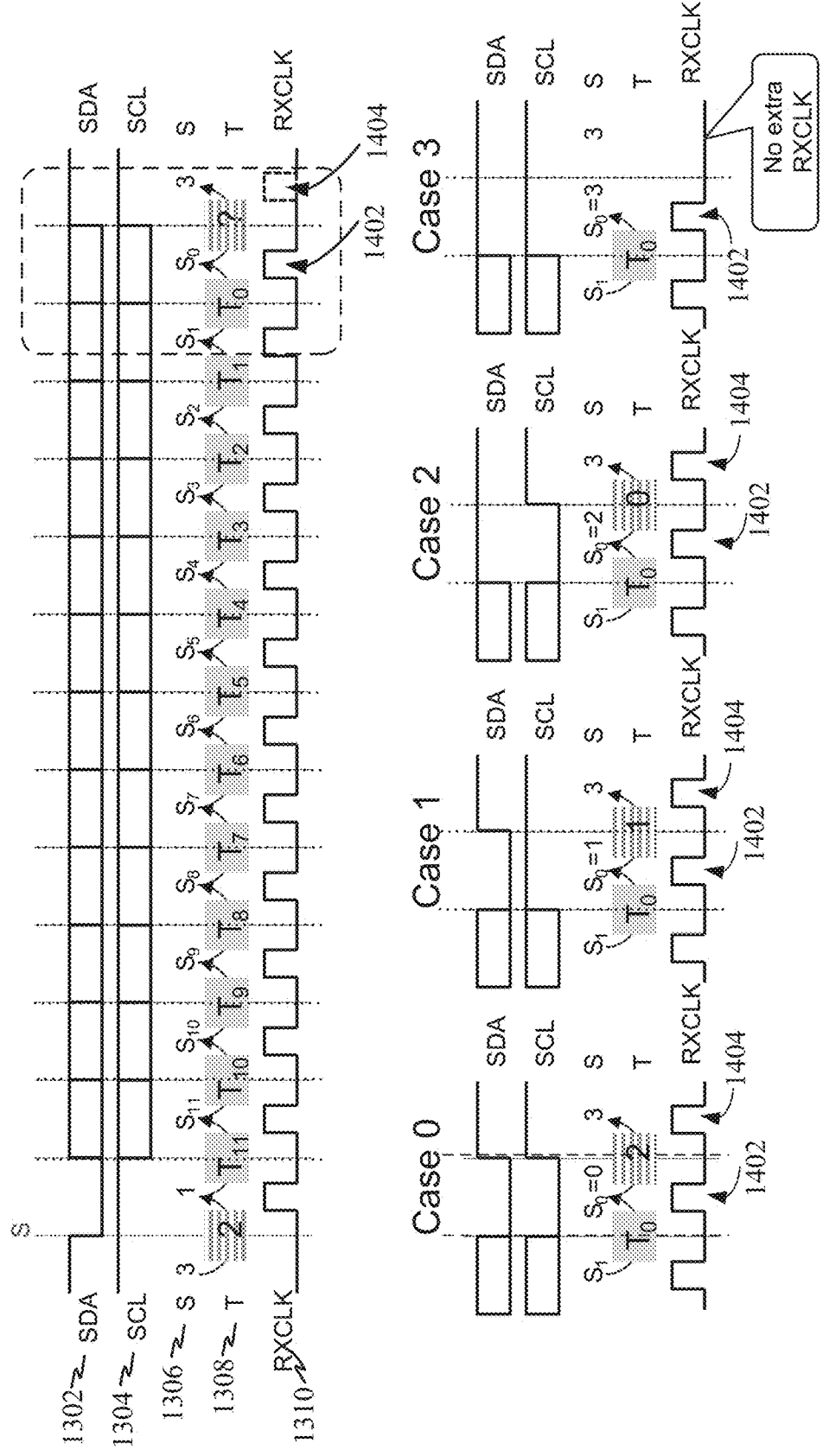
FIG. 14 illustrates different recovered clock conditions depending on the states of the two-line bus.

FIG. 14 illustrates different recovered clock conditions depending on the states of the two-line bus 1302 and 1304. In cases 0, 1, 2, and 3, the symbols are all received on the last or twelfth clock 1402, and an additional clock 1404 is not always available to write the data into registers. While this thirteenth clock may be used to write received data into registers, such additional clock cycle 1404 is not available in case 3. This would prevent the receiver from being able to write the received data into the registers.

However, the use of the down counter (DNCNT) 1312 and the word marker 815 permits consistently permits writing received data to registers even in case 3. As described and illustrated further in FIG. 15, the register write operation is performed on the last recovered clock RXCLK 1310 cycle without the need for a free-running or additional clock on the slave device and without the need to insert unused/padding bits solely for the purpose of making an extra clock cycle available.

Figure 15:
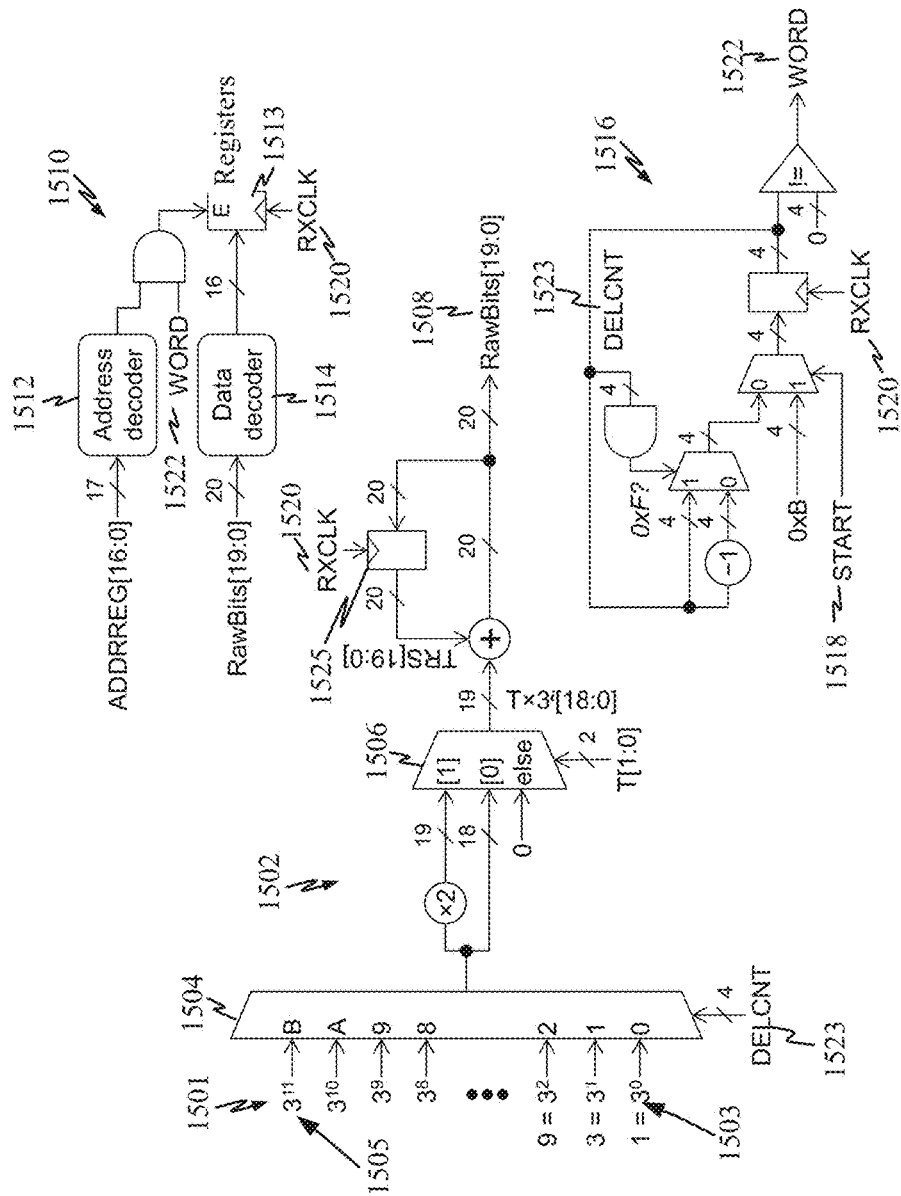
FIG. 15 illustrates circuits for converting a twelve digit ternary number into bits and achieving a register write operation of extracted bits using only the recovered clock.

FIG. 15 illustrates circuits for converting a twelve digit ternary number into bits and achieving a register write operation of extracted bits using only the recovered clock. Referring back to FIG. 8, original data of twenty (20) bits is converted into a ternary number, then this transition number is converted (i.e., transcoded) to twelve sequential symbols, and these transcoded symbols are transmitted on the bus. A receiving device (e.g., a slave device) receives the transmission and performs clock recovery and symbol sampling to convert the transcoded symbols back to a ternary number which is then supplied to the circuit in FIG. 15 which converts the ternary number back to the original twenty bit binary data.

A first circuit 1502 is used to extract twenty (20) raw bits 1508 from twelve (12) symbols. These twelve symbols serve as inputs that are converted into ternary weights 1501 which serve as inputs to a single output multiplexer 1504. This allows serialization of the ternary number 1501 so that twenty raw bits 1508 can be extracted. The twenty bits may include sixteen (16) data bits and four (4) control bits. A second multiplexer 1506 functions as a multiplier for a Ti×3^i operation and is triggered by the 2-bit output from the symbol-to-ternary number block 830 (FIGS. 8 and 12). A first flip-flop 1525, triggered by the extracted clock RXCLK 1520, is used to accumulate the transitory bits as the ternary number 1501 is decoded or converted from the ternary weights 1501 to the raw bits 1508. Note that the occurrence of the last symbol S0 1321 is received after the penultimate clock C11 1317 triggers the first flip flop 1525 to output the collected transitory bits to be added with the bits from the last ternary weight 1503 output by a second multiplexer 1506. Consequently, the raw bits 1508 (e.g., data 1522 in FIG. 15) are available after the last symbol S0 is input (after the penultimate clock cycle C11 1317) but before the last clock cycle C12 1319.

A second circuit 1516 may serve to obtain a word marker 1522 when all symbols are received. Upon detecting a start indicator 1518 (e.g., clock 1311 in FIG. 13) of the receiver clock 1522, a down counter DELCNT 1523 starts counting down from 0xB hex (or 12) to zero (0x0 hex at the penultimate clock C11 1317) and then 0xF hex (at the last clock C12 1319). A word marker 1522 (e.g., marker 1315 in FIG. 13) is triggered upon the down counter reaching 0x0 hex. This word marker 1522 serves as input to a third circuit 1510 to enable writing data bits into registers. Note that the down counter DELCNT 1523 also serves to select an input signal from the multiplexer 1504, starting with input "B" (first ternary weight 1505) and counting down to input "0" (last ternary weight 1503).

The third circuit 1510 illustrates how the received bits may be written into a second flip-flop or registers 1513. An address decoder 1512 receives seventeen (17) bits of address information and decodes it. Similarly, a data decoder 1514 receives the twenty (20) raw bits 1508 and decodes them to obtain, for example, sixteen (16) data bits (i.e., the four control bits are removed from the twenty raw bits). When the word marker 1522 is triggered (e.g., 1315 in FIG. 13) and address is decoded, this enables writing of the decoded data (from data decoder 1514) to be stored in flip-flops or register 1513 (e.g., write the sixteen (16) data bits into flip-flops or registers 1513). This third circuit 1510 effectively uses the word marker 1522 to trigger a write to the second flip-flop or registers 1513 on the last clock cycle C12 1319 (FIG. 13).

On the penultimate clock cycle (e.g., clock C11 1317 in FIG. 13), the down counter DELCNT 1523 (which started at 0xB hex) reaches 0x0 hex, hence the word marker 1522 goes from low to high (triggering marker 1315 FIG. 13). At the last clock cycle C12 1319, the second flip flop or register 1513 is enabled and stores the 16-bit bus now carrying the decoded data bits.

This approach permits storing the received data bits into flip-flops or registers 1513 without a running clock on the slave device. Consequently, the slave device can go into a sleep mode without notifying the master device. That is, no separate mechanism is needed for a master device to be informed when a slave device goes into a sleep mode (e.g., no "slave sleep request" is necessary from a slave device). Because the embedded clock allows the slave device to receive the transmitted bits and the third circuit 1510 generates an additional clock without the need for the slave device to be awake, a master device can write data to a slave device register even when the slave device is asleep or in a sleep mode (e.g., without the need for a free-running clock). In some implementations, the slave device may use the written register data to conditionally wake up part or all its functionality. Therefore, the master device does not have to know whether the slave device is awake or sleeping before sending or writing data to the slave device. Additionally, the slave device may independently enter into a sleep mode without notifying the master device.

Figure 16:
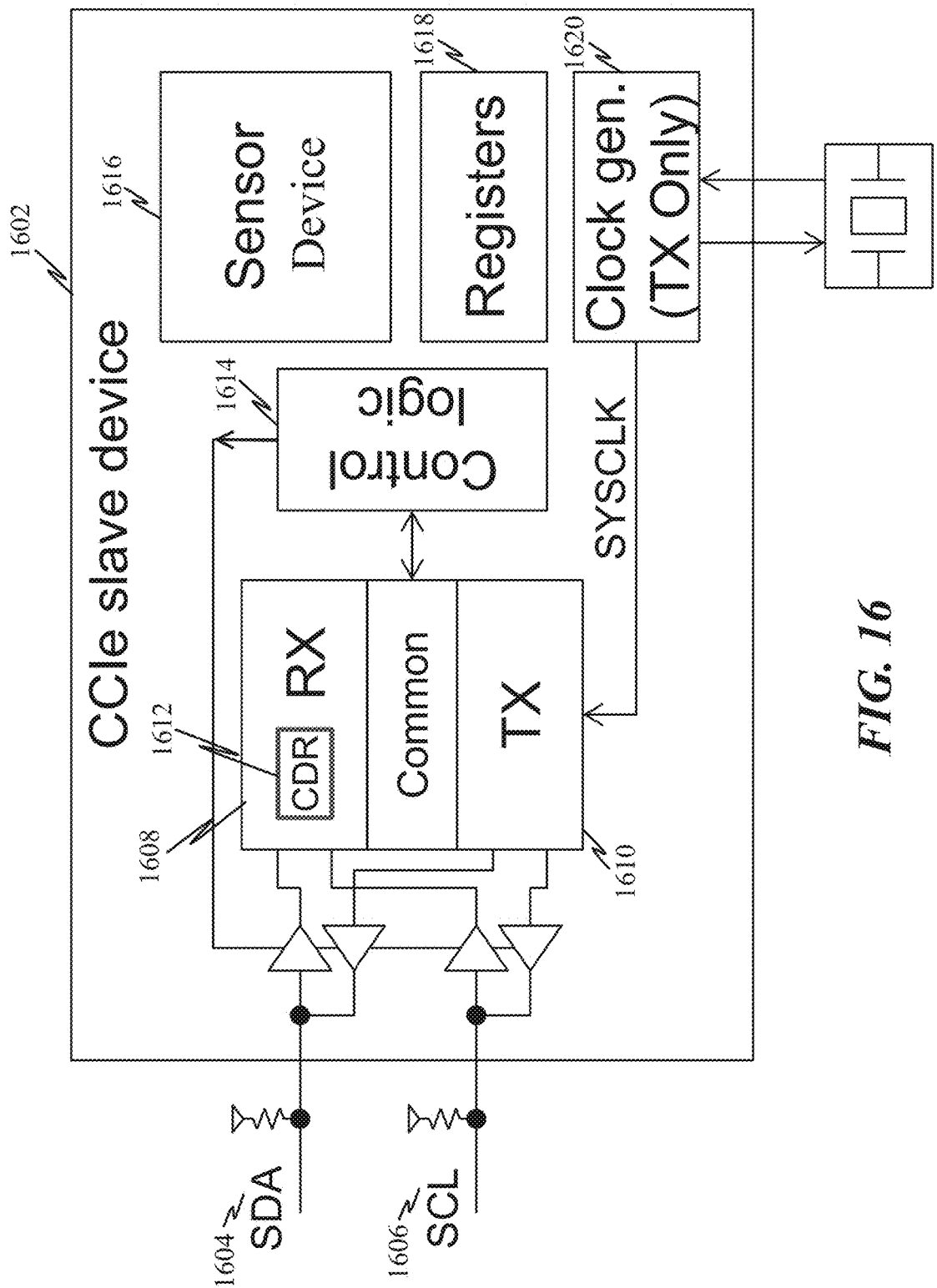
FIG. 16 illustrates an exemplary CCIe slave device configured to receive a transmission from a shared bus by using a clock extracted from the received transmission and writing data from the transmission without the need for the slave device to be awake.

FIG. 16 illustrates an exemplary CCIe slave device 1602 configured to receive a transmission from a shared bus by using a clock extracted from the received transmission and writing data from the transmission without the need for the slave device to be awake. The slave device 1602 includes a receiver circuit 1608 and a transmitter circuit 1610 coupled to a shared bus 1604 and 1606. A control logic 1614 may serve to selectively activate/deactivate the receiver circuit 1608 and/or transmitter circuit 1610 so that the slave device receives or transmits over the shared bus 1604 and 1606. The slave device 1602 may also include a sensor device that captures or collects information for transmission from the slave device.

The receiver circuit 1608 may include a clock data recovery circuit 1612 may extract a receiver clock (RXCLK) from the symbol-to-symbol transitions as illustrated in FIGS. 9, 11, and 13. The receiver circuit 1608 may also include one or more of the first circuit 1502, second circuit 1510, and/or third circuit 1516 (FIG. 15) to decode and extract data received over the shared bus and store such data in registers 1618 using only the extracted clock from the received data transmission and without introducing delays of the extracted clock. Note that the first circuit 1502, second circuit 1510, and/or third circuit 1516 (FIG. 15) may be integrated into one circuit or distributed among different modules or sub-systems.

A clock generator 1620 may be present within the slave device 1602, but it is used only for transmission of data from the slave device and/or other slave device operation, e.g. motion detection or temperature measurement by sensor devices.

Figure 17:
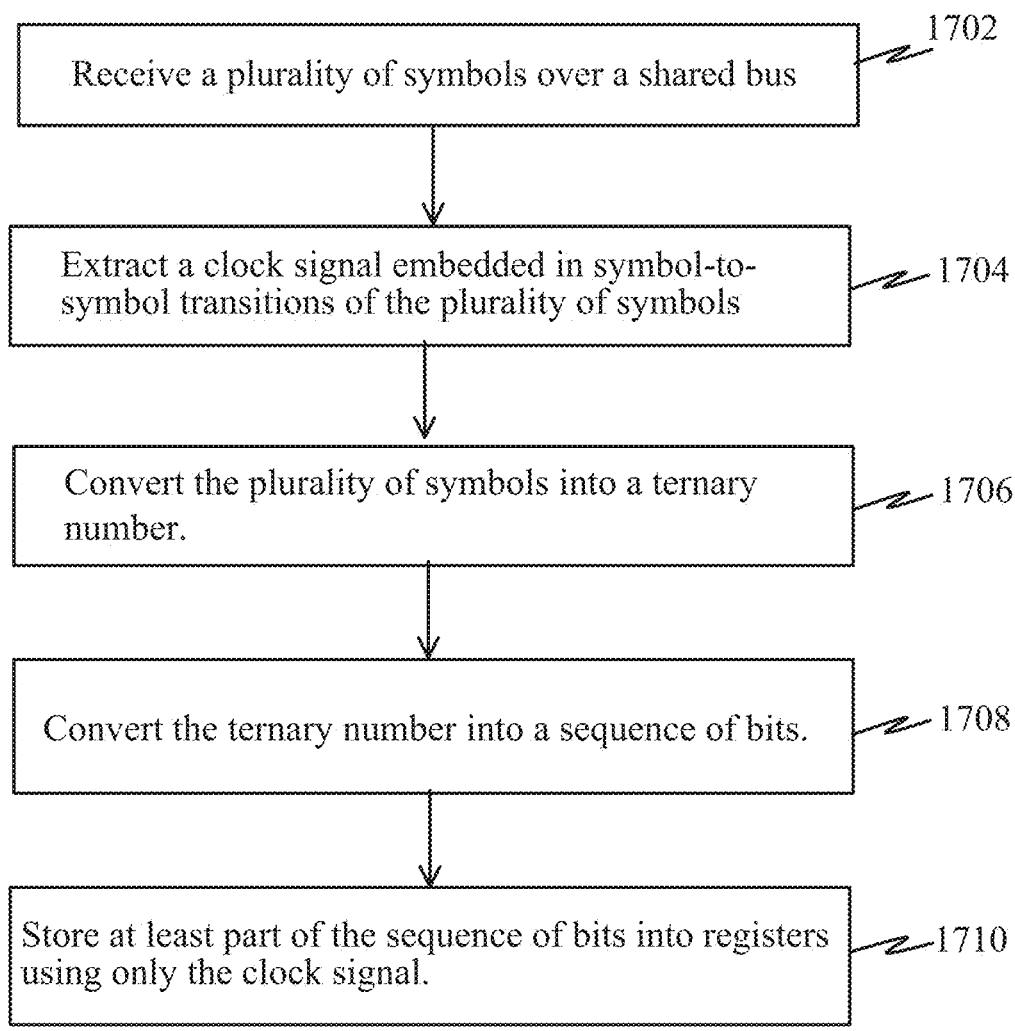
FIG. 17 illustrates a method operational on a slave device to receive a transmission over a shared bus and store such data within such transmission into registers using only a clock recovered from the transmission.

FIG. 17 illustrates a method operational on a slave device to receive a transmission over a shared bus and store such data within such transmission into registers using only a clock recovered from the transmission. For instance, such method may be implemented by the receiver device in FIG. 16. A plurality of symbols may be received over a shared bus 1702. A clock signal embedded in symbol-to-symbol transitions of the plurality of symbols is extracted 1704. The plurality of symbols is converted into a ternary number 1706. The ternary number may be converted into a sequence of bits 1708. At least part of the sequence of bits may be stored into registers using only the clock signal 1710.

Figure 18:
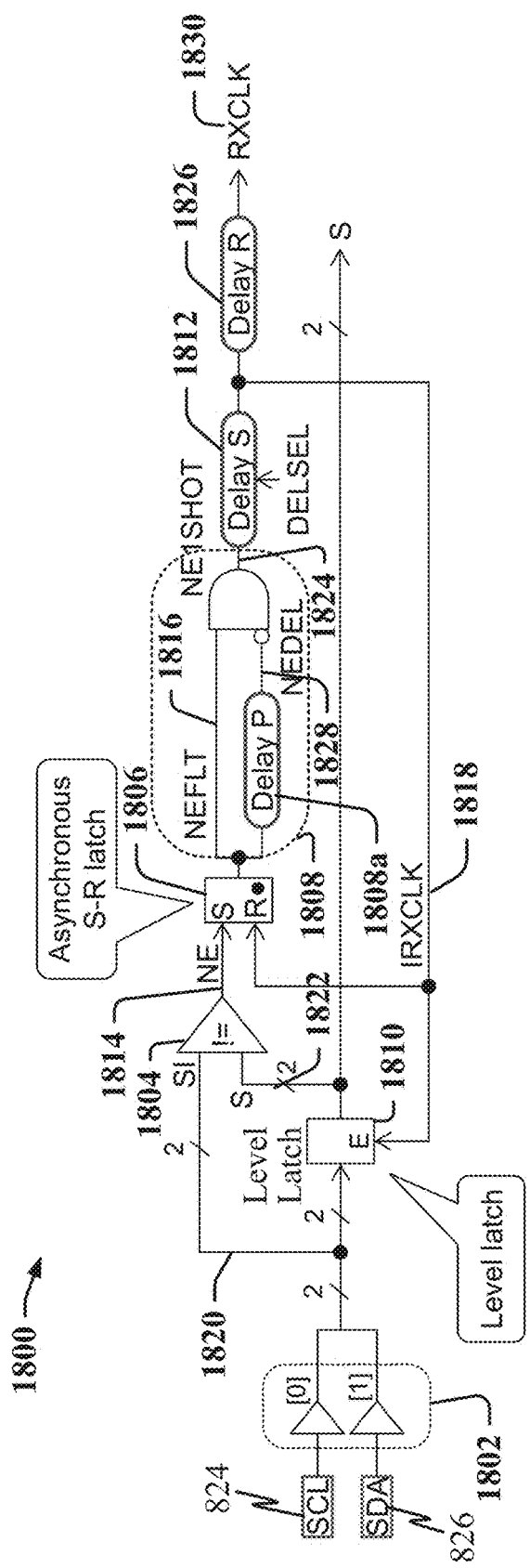
FIG. 18 illustrates an example of a clock recovery circuit according to one or more aspects disclosed herein.
Figure 19:
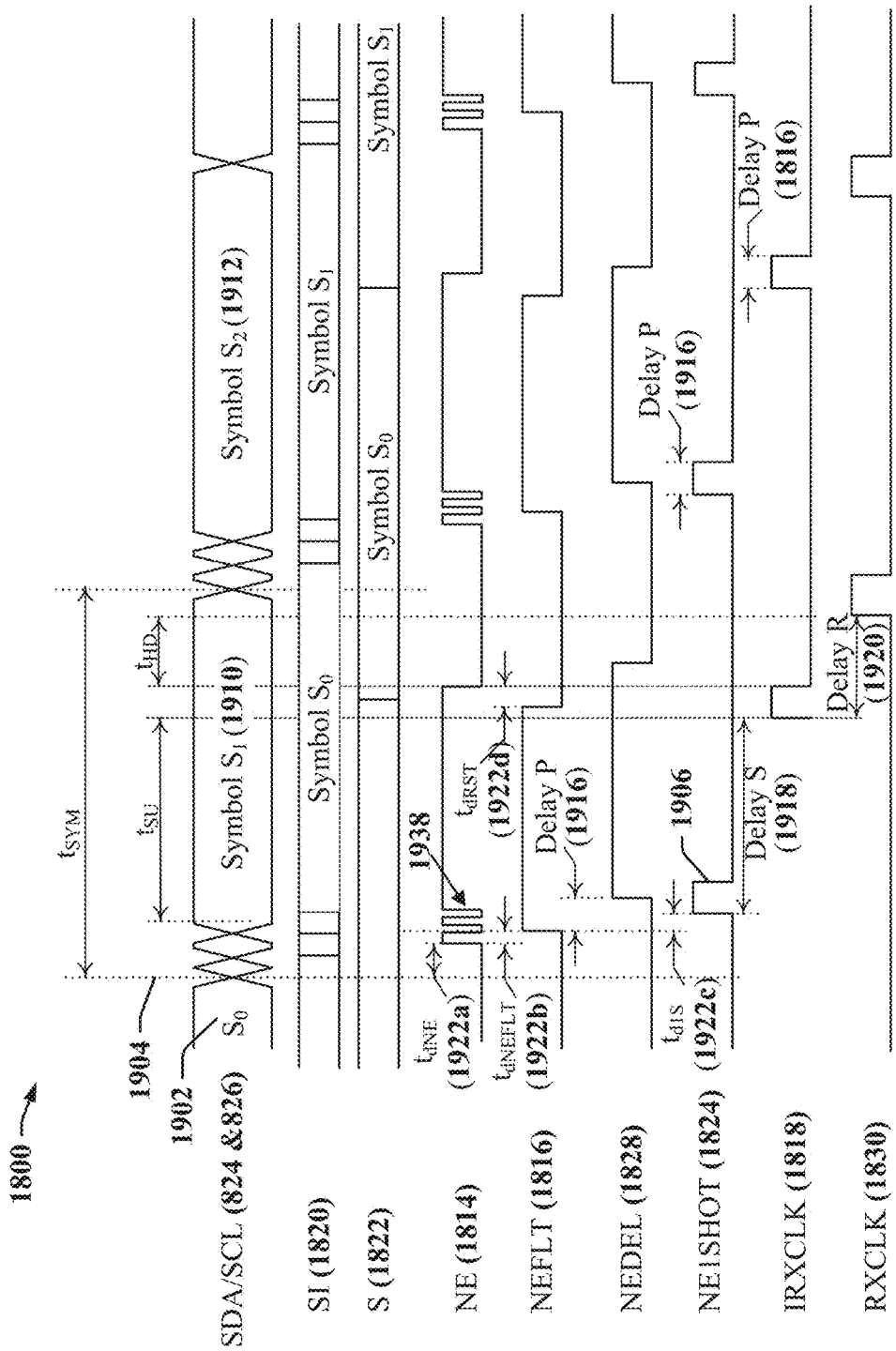
FIG. 19 shows an example of timing of certain signals generated by the exemplary clock recovery circuit of FIG. 18.

FIG. 18 illustrates an example of a CDR circuit 1800 according to one or more aspects disclosed herein and FIG. 19 shows an example of timing of certain signals generated by the CDR circuit 1800. The CDR circuit 1800 may be used in a CCIe transmission scheme where clock information is embedded in transmitted sequences of symbols. The CDR circuit 1800 may be used as the CDR 1228 (FIG. 12) or CDR 1612 (FIG. 16). The CDR circuit 1800 includes analog delay elements 1808a, 1812 and 1826, which are configured to maximize set up time for symbols 1910, 1912 received from a CCIe two-line bus 824 & 826 (FIG. 8). The CDR circuit 1800 includes a comparator 1804, a set-reset latch 1806, a one-shot element 1808 including first delay element 1808a, a second analog delay element 1812, a third analog delay element 1826 and a level latch 1810. The comparator 1804 may compare an input signal (SI) 1820 that includes a stream of symbols 1910 and 1912 (FIG. 19) with a signal (S) 1822 that is a level-latched instance of the SI signal 1820. The comparator outputs a comparison signal (NE) 1814. The set-reset latch 1806 receives the NE comparison signal 1814 from the comparator 1804 and outputs a filtered version of the comparison signal (NEFLT) 1816. The first analog delay device 1808a may receive the filtered version of the NEFLT signal 1816 and outputs a signal (NEDEL signal) 1828 that is a delayed instance of the NEFLT signal 1816. In operation, the one-shot logic 1808 receives the NEFLT signal 1816 and the delayed NEDEL signal 1828 and outputs a signal (NE1SHOT) 1824 that includes a pulse 1906 (FIG. 19) that is triggered by the NEFLT signal 1816.

The second analog delay device 1812 receives the NE1SHOT signal 1824 and outputs the IRXCLK signal 1818, where the IRXCLK signal 1818 may be used to generate an output clock signal 1830 using the third analog delay element 1826. The output clock signal 1830 may be used for decoding the latched symbols in the S signal 1822. The set-reset latch 1806 may be reset based on the state of the IRXCLK signal 1818. The level latch 1810 receives the SI signal 1820 and outputs the level-latched S signal 1822, where the level latch 1810 is enabled by the IRXCLK signal 1818.

When a first symbol value $S_1$ 1910 is being received, it causes the SI signal 1820 to commence changing its state. The state of the SI signal 1820 may be different from the state of the $S_1$ signal 1910 due to the possibility that intermediate or indeterminate states may occur at the signal transition from the previous symbol $S_0$ 1902 to the first symbol $S_1$ 1910 due to inter-wire skew, signal overshoot, signal undershoot, crosstalk, and so on. The NE signal 1814 transitions high when the comparator 1804 detects different value between the SI signal 1820 and the S signal 1822, causing the set-reset latch 1806 to be asynchronously set. Accordingly, the NEFLT signal 1816 transitions high, and this high state is maintained until the set-reset latch 1806 is reset when IRXCLK 1818 becomes high. The IRXCLK 1818 transitions to a high state in delayed response to the rising of the NEFLT signal 1816, where the delay is attributable in part to the analog delay element 1812.

The intermediate states on the SI signal 1820 may be regarded as invalid data and may include a short period of symbol value of the symbol $S_0$ 1902, and these intermediate states may cause spikes or transitions 1938 in the NE signal 1814 as the output of the comparator 1804 returns towards a low state for short periods of time. The spikes 1938 do not affect NEFLT signal 1816 output by the set-reset latch 1806, because the set-reset latch 1806 effectively blocks and/or filters out the spikes 1938 on the NE signal 1814 before outputting the NEFLT signal 1816.

The one-shot circuit 1808 outputs a high state in the NE1SHOT signal 1824 after the rising edge of the NEFLT signal 1816. The one-shot circuit 1808 maintains the NE1SHOT signal 1824 at a high state for the delay period P 1916 before the NE1SHOT signal 1824 returns to the low state. The resultant pulse 1906 on the NE1SHOT signal 1824 propagates to the IRXCLK signal 1818 after the delay S period 1918 caused by the analog delay S element 1812. The high state of the IRXCLK signal 1818 resets the set-reset latch 1806, and the NEFLT signal 1816 transitions low. The high state of IRXCLK signal 1818 also enables the level latch 1810 and the value of the SI signal 1820 is output as the S signal 1822.

The comparator 1804 detects when the S signal 1822 corresponding to the $S_1$ symbol 1910 matches the symbol $S_1$ symbol 1910 of the SI signal 1820, and the output of the comparator 1804 drives the NE signal 1814 low. The trailing edge of the pulse 1906 on the NE1SHOT signal 1824 propagates to the IRXCLK signal 1818 after the delay S period 1918 caused by the analog delay S element 1812. When a new symbol $S_2$ 1912 is being received, the SI signal 1820 begins its transition to the value corresponding to the symbol $S_2$ 1912 after the trailing edge of the IRXCLK signal 1818.

In one example, the output clock signal RXCLK 1830 is delayed by a Delay R period 1920 by the third analog delay element 1826. The output clock signal 1830 and the S signal 1822 (data) may be provided to the decoding circuits 1502, 1510, and/or 1516 (FIG. 15). The decoding circuits 1502, 1510, and/or 1516 (FIG. 15) may sample the symbols on the S signal 1822 using the output clock signal 1830 or a derivative signal thereof.

In the example depicted, various delays 1922a-1922d may be attributable to switching times of various circuits and/or rise times attributable to connectors. In order to provide adequate setup times for symbol capture by a decoding circuit, the timing constraint for the symbol cycle period $t_{SYM}$ may be defined as follows:

$$t_{dNE} + t_{dNEFLT} + t_{d1S} + \text{Delay } S + \text{Delay } P + \max(t_{HD}, t_{REC} - t_{dNE}) < t_{SYM}$$

and the timing constraint for the setup time $t_{SU}$ may be as follows:

$$\text{Max skew spec} + t_{SU} < t d N E + t d 1 S + \text{Delay } S$$

where:

- $t_{sym}$: one symbol cycle period,
- $t_{SU}$: setup time of SI 1820 for the level latches 1810 referenced to the rising (leading) edge of IRXCLK 1818,
- $t_{HD}$: hold time of SI 1820 for the level latches 1810 referenced to the falling (trailing) edge of IRXCLK 1818,
- $t_{dNE}$: propagation delay of the comparator 1804, $t_{dRST}$: reset time of the set-reset latch 1806 from the rising (leading) edge of IRXCLK 1818.

The CDR circuit 1800 employs analog delay circuits 1808a, 1812 and 1826 to ensure that a receiver device (e.g., slave device 1602) may decode CCIe encoded symbols and store the resulting bits into registers without using a free-running system clock. Accordingly, a CCIe slave device 1602 (see FIG. 16) may be adapted to use a transmit clock 1620 as a system clock when responding to a CCIe READ command, and the CDR generated clock 1830 may be used when receiving data or when the slave device is asleep.

Exemplary Legacy Device and Operation Thereof

Figure 23:
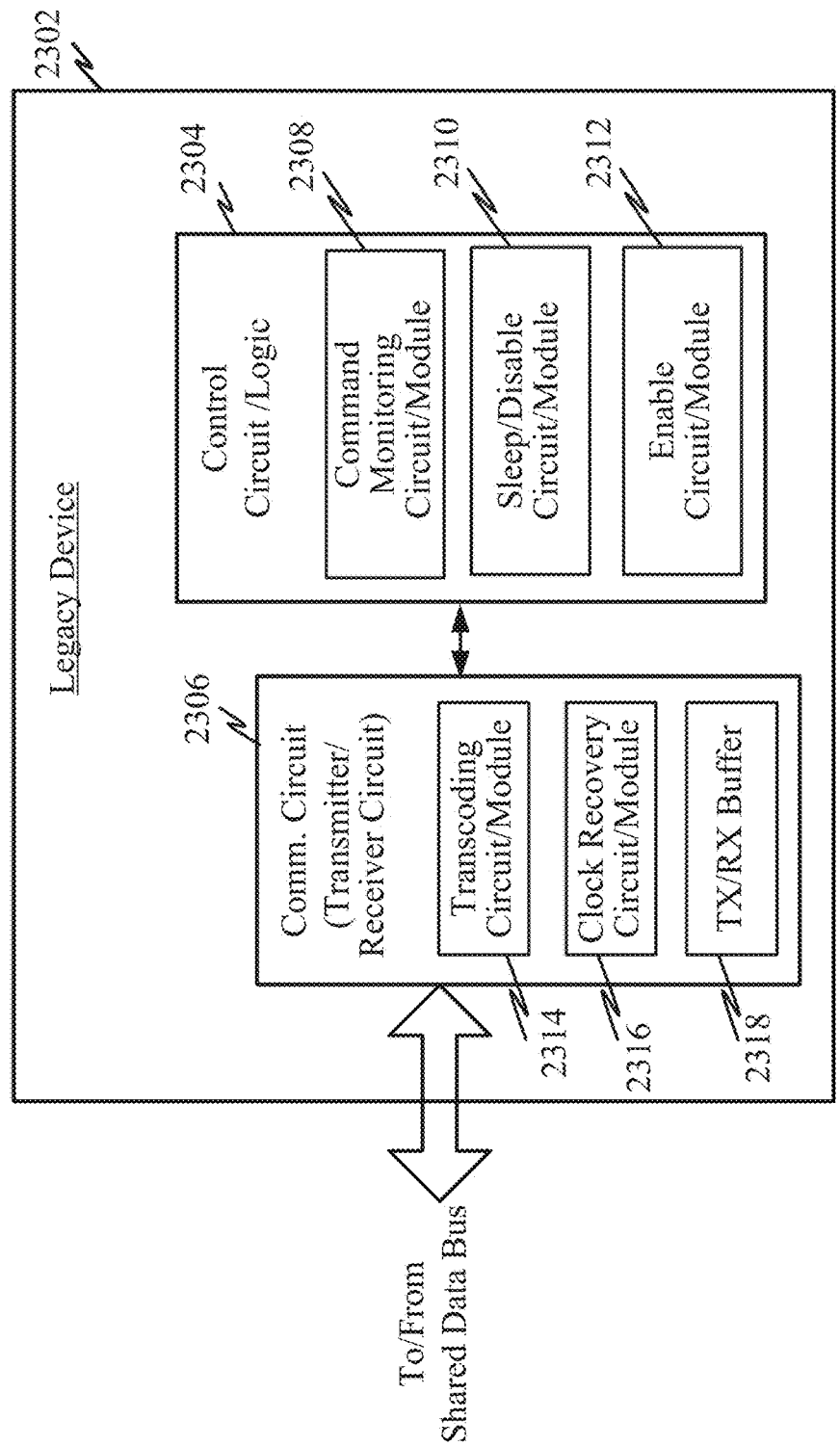
FIG. 23 is a block diagram illustrating an exemplary legacy device.

FIG. 23 is a block diagram illustrating an exemplary legacy device 2302. In one example, the legacy device 2302 may be a CCIe-compatible device. The device 2302 may include a control circuit/logic 2304 coupled to a communication circuit 2306. The communication circuit 2306 may serve to couple to a shared data bus and may be configured to communicate over the bus according to a first communication protocol. In one example, the communication circuit 2306 may include or define a transmitter/receiver circuit 2306 that implement a transcoding circuit/module 2314, a clock recovery circuit/module 2316, and/or a transmit/receive buffer 2318. The transcoding circuit/module 2314 may perform one or more functions illustrated in FIGS. 3-22 to convert bits into symbols for transmission over the bus and to convert received symbols to bits upon reception over the bus. This transcoding may also effectively embed a clock within symbol-to-symbol transitions. The clock recovery circuit/module 2316 may serve to extract such embedded clock from the symbol-to-symbol transitions. The transmit/receive buffer 2318 may serve to buffer bits for transmission and/or during reception.

The control circuit/logic 2304 may include or implement a command monitoring circuit/module 2308, a sleep/disable detection circuit/module 2310, and/or an enable detection circuit/module 2312. The control circuit/logic 2304 may be adapted to configure the communication circuit 2306 to communicate over the bus using the first communication protocol. The command monitoring circuit/module 2308 may monitor the bus for a sleep or disable command. If a sleep or disable command is detected, then the sleep/disable circuit/module may fully or partially disable operation of the communication circuit 2306 to ignore activity over the bus.

In one example, the bus may be a two-line bus. In the first communication protocol signals may be transmitted over the two lines and a clock signal is embedded in symbol-to-symbol transitions of the plurality of symbols within the signals.

The sleep or disable command may cause the device to stop operating over the bus (e.g., stop transmitting and stop receiving from the bus). For instance, the disable command may prevent the device from communicating over the bus until a power on reset or hardware reset of the device. In another example, the sleep command may prevent each of the device from communicating over the bus until a wakeup command is received over the bus.

In an exemplary implementation, the communication circuit 2306 may include or implement a receiver device configured to, at least partially, decode signals on the bus using just a clock signal embedded within signals transmitted according to the first communication protocol.

Figure 24:
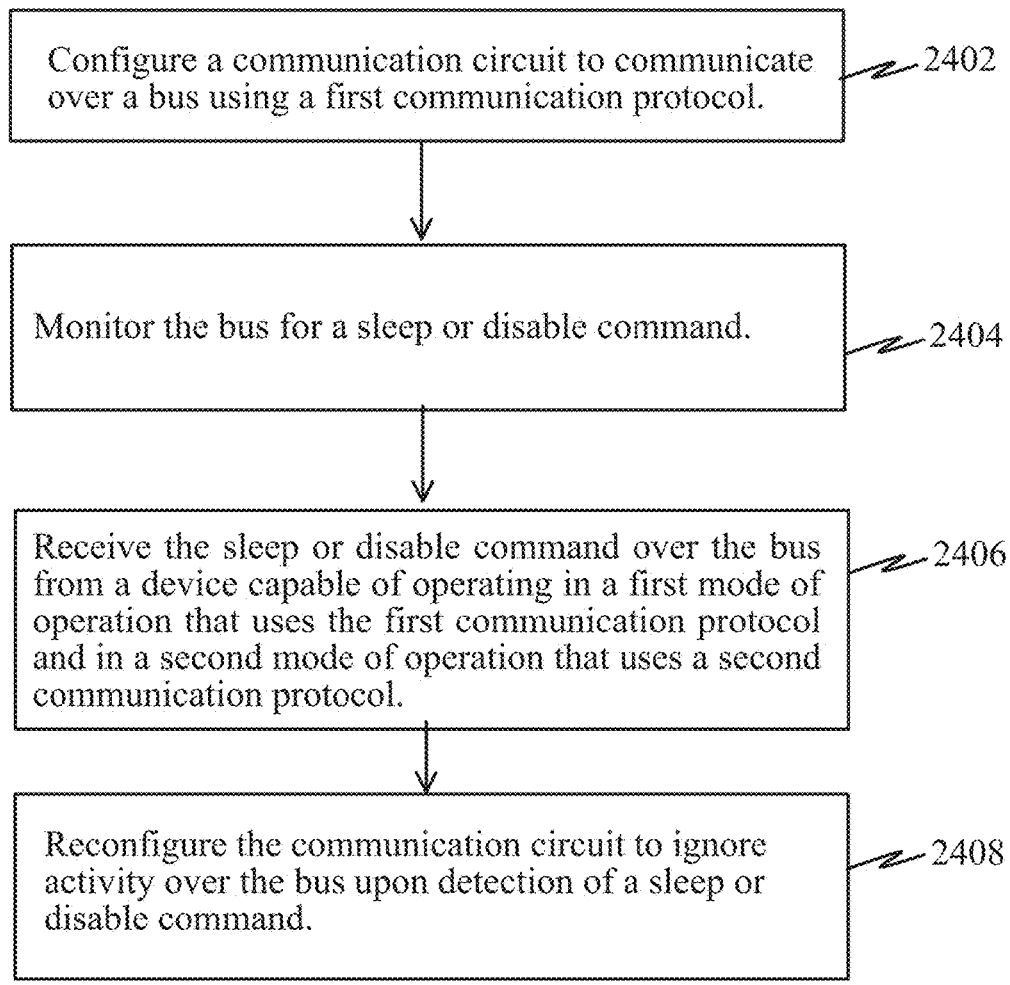
FIG. 24 illustrates an exemplary method that may be implemented by a legacy device.

FIG. 24 illustrates an exemplary method that may be implemented by a legacy device. A communication circuit may be configured to communicate over a bus using a first communication protocol 2402. The device may monitor the bus for a sleep or disable command 2404. The device may receive the sleep or disable command over the bus from a second device capable of operating in a first mode of operation that uses the first communication protocol and in a second mode of operation that uses a second communication protocol 2406. The communication circuit may be reconfigured to ignore activity over the bus upon detection of a sleep or disable command 2408.

The first communication protocol may provide a first data throughput over the bus while the second communication protocol provides a second data throughput over the bus, where the second data throughput is greater than the first data throughput.

The bus may include two lines, and in the first mode of operation signals are transmitted over the two lines and a clock signal is embedded in symbol-to-symbol transitions of the plurality of symbols within the signals.

The sleep or disable command may be received prior to or concurrent with the bus being switched to operate according to a second communication protocol unsupported by the device.

Exemplary Next-Generation Device and Operation Thereof

Figure 25:
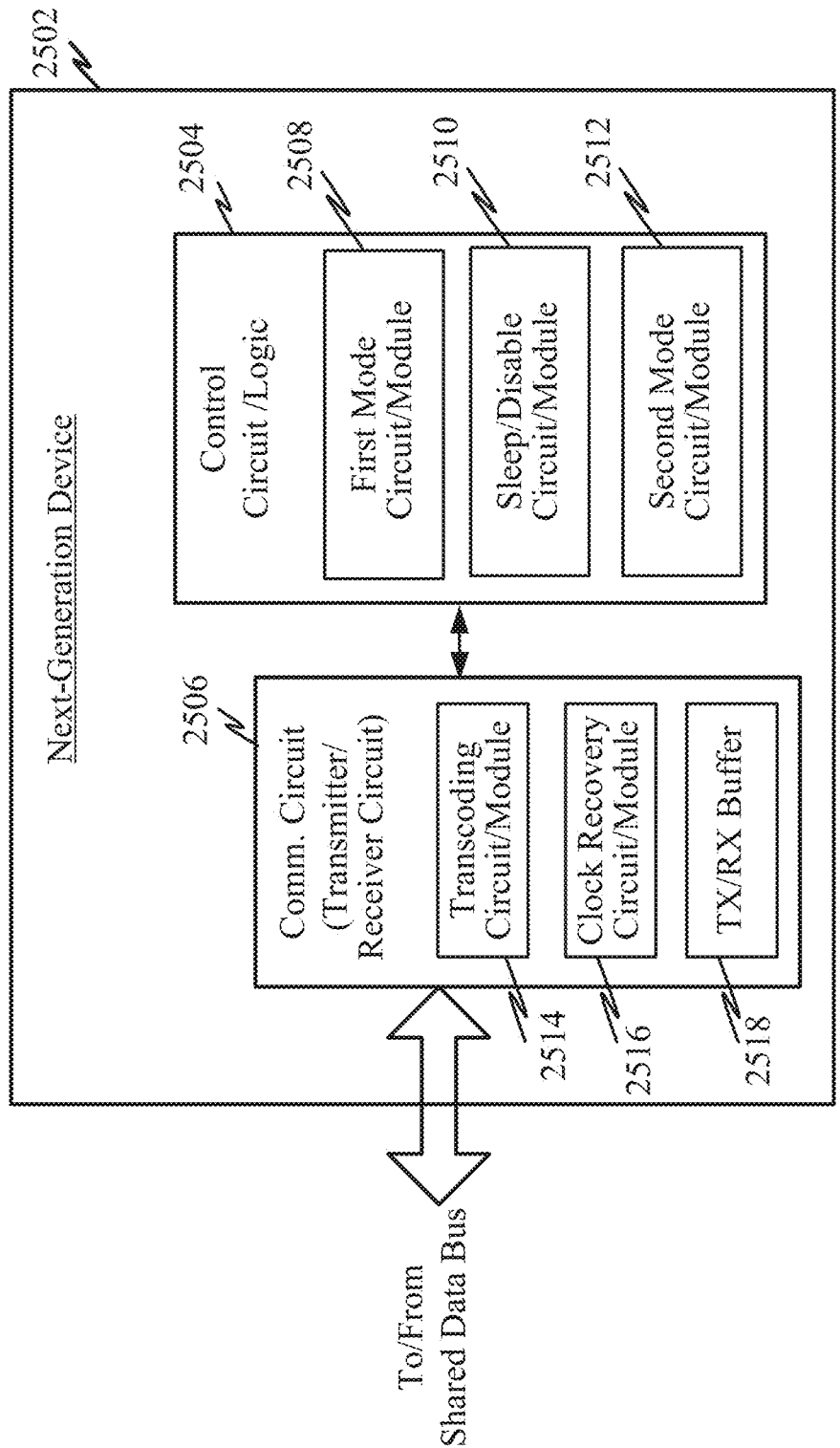
FIG. 25 is a block diagram illustrating an exemplary next-generation device.

FIG. 25 is a block diagram illustrating an exemplary next-generation device 2502. In one example, the next-generation device 2502 may be a CCIe-compatible device. The device 2502 may include a control circuit/logic 2504 coupled to a communication circuit 2506.

The communication circuit 2506 may serve to couple to a bus shared with other devices. The communication circuit 2506 may se be configurable to communicate over the bus according to a first communication protocol or a second communication protocol. In one example, the communication circuit 2506 may include or define a transmitter/receiver circuit 2506 that implement a transcoding circuit/module 2514, a clock recovery circuit/module 2516, and/or a transmit/receive buffer 2518. The transcoding circuit/module 2514 may perform one or more functions illustrated in FIGS. 3-22 to convert bits into symbols for transmission over the bus and to convert received symbols to bits upon reception over the bus when using the first communication protocol. This transcoding may also effectively embed a clock within symbol-to-symbol transitions. The clock recovery circuit/module 2516 may serve to extract such embedded clock from the symbol-to-symbol transitions. The transmit/receive buffer 2518 may serve to buffer bits for transmission and/or during reception.

The control circuit 2504 may include or implement a first mode circuit/module 2508 adapted to configure the communication circuit 2506 to operate in a first mode in which a first communication protocol is used over the bus. The control circuit 2504 may include or implement a sleep/disable circuit/module 2510 that sends a sleep or disable command over the bus to indicate to other devices that do not support a second communication protocol to ignore activity over the bus. The control circuit 2512 may include or implement a second mode circuit/module adapted to reconfigure the communication circuit to operate in a second mode in which the second communication protocol is used over the bus.

In one example, the first communication protocol provides a first data throughput/rate over the bus while the second communication protocol provides a second data throughput/rate over the bus, where the second data throughput/rate is greater than the first data throughput/rate.

The bus may include or be defined by two lines, wherein the first mode of operation signals are transmitted over the two lines and a clock signal is embedded in symbol-to-symbol transitions of the plurality of symbols within the signals.

The disable command may prevent the other devices from communicating over the bus until a power on reset or hardware reset of each of the other devices. The sleep command may prevent the other devices from communicating over the bus until a wakeup command is sent by the device over the bus.

The sleep or disable command may be sent prior to or concurrent with the device entering the second mode.

The communication circuit may include a receiver device capable of at least partially decoding signals on the bus using just a clock signal embedded within signals transmitted according to the first communication protocol.

Figure 26:
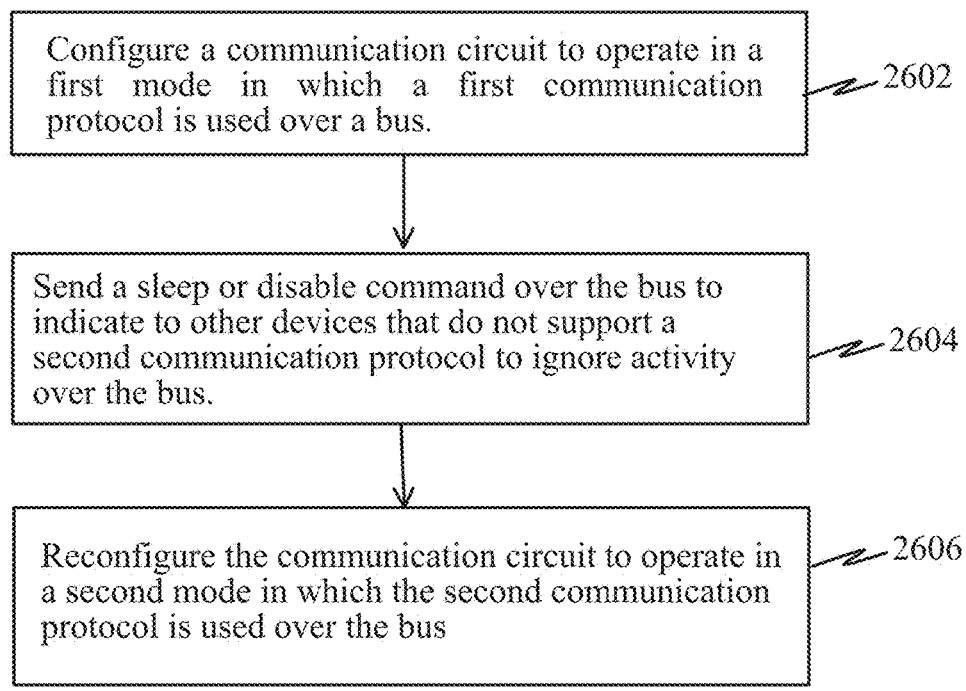
FIG. 26 illustrates an exemplary method that may be implemented by a next-generation device.

FIG. 26 illustrates an exemplary method that may be implemented by a next-generation device. A communication circuit may be configured to operate in a first mode in which a first communication protocol is used over a bus 2602. The next-generation device may send a sleep or disable command over the bus to indicate to other devices that do not support a second communication protocol to ignore activity over the bus 2604. Subsequently, the communication circuit may be reconfigured to operate in a second mode in which the second communication protocol is used over the bus 2606.

The bus may include two lines, and in the first mode of operation signals are transmitted over the two lines and a clock signal is embedded in symbol-to-symbol transitions of the plurality of symbols within the signals.

In one example, the sleep or disable command may be sent prior to or concurrent with the device entering the second mode.

One or more of the components, steps, features, and/or functions illustrated in the Figures may be rearranged and/or combined into a single component, step, feature, or function or embodied in several components, steps, or functions. Additional One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
a bus having two lines configured for serial data communication, the bus being operable in at least one mode to communicate the serial data over a first line in accordance with a clock signal transmitted over a second line and operable in another mode to communicate data in a sequence of two-bit symbols using the first line and the second line;
a first set of devices coupled to the bus and configured to communicate over the bus according to a first communication protocol;
a second set of devices coupled to the bus and configured to communicate over the bus according to both the first communication protocol and a second communication protocol,
wherein
in a first mode of operation the first set of devices and second set of devices concurrently communicate over the bus using the first communication protocol; and
in a second mode of operation the second set of devices communicate with each other using the second communication protocol over the bus, and the first set of devices are caused to stop operating on the bus.

2. The device of claim 1, wherein the first communication protocol provides a first data throughput over the bus while the second communication protocol provides a second data throughput over the bus, where the second data throughput is greater than the first data throughput.

3. The device of claim 1, wherein the bus is operated in accordance with an I2C protocol in the first mode of operation.

4. The device of claim 1, wherein during the first mode of operation a plurality of data bits are encoded in sequences of two-bit symbols transmitted in state of the two lines, and wherein the clock signal is embedded in symbol-to-symbol transitions of the state of the two lines.

5. The device of claim 1, wherein during the first mode of operation, at least one of the second set of devices sends a disable command or a sleep command over the bus to cause the first set of devices to stop operating on the bus.

6. The device of claim 5, wherein the disable command prevents each of the first set of devices from communicating over the bus until a power on reset or hardware reset of the first set of devices.

7. The device of claim 5, wherein the sleep command prevents each of the first set of devices from communicating over the bus until a wakeup command is received over the bus.

8. The device of claim 1, wherein prior to or concurrent with entering the second mode of operation, at least one device from the second set of devices causes the first set of devices to enter a sleep or disabled mode.

9. The device of claim 1, wherein during the second mode of operation the first set of devices are unaffected by bus activity.

10. The device of claim 1, wherein each of the first set of devices includes a receiver device capable of at least partially decoding signals on the bus using just a clock signal embedded within signals transmitted according to the first communication protocol.

11. The device of claim 10, wherein the receiver device enters into a sleep mode or disabled mode upon receipt of a sleep command or disable command, respectively.

12. The device of claim 10, wherein the receiver device wakes up upon receipt of a wakeup command.

13. A method, comprising:
configuring a bus for serial data communication, the bus being operable in at least one mode to communicate the serial data over a first line in accordance with a clock signal transmitted over a second line and operable in another mode to communicate data in a sequence of two-bit symbols using the first line and the second line;
coupling a first set of devices to the bus, the first set of devices configured to communicate over the bus according to a first communication protocol;
coupling a second set of devices to the bus, the second set of devices configured to communicate over the bus according to both the first communication protocol and a second communication protocol;
configuring, in a first mode of operation, the first set of devices and second set of devices to concurrently communicate over the bus using the first communication protocol; and
sending a disable command or a sleep command, from at least one of the second set of devices, over the bus during the first mode of operation to cause the first set of devices to stop operating on the bus.

14. The method of claim 13, wherein the first communication protocol provides a first data throughput over the bus while the second communication protocol provides a second data throughput over the bus, where the second data throughput is greater than the first data throughput.

15. The method of claim 13, wherein the bus includes two lines.

16. The method of claim 15, wherein during the first mode of operation a plurality of data bits are encoded in sequences of two-bit symbols transmitted in state of the two lines, and wherein the clock signal is embedded in symbol-to-symbol transitions of the state of the two lines.

17. The method of claim 13, wherein during the first mode of operation, at least one of the second set of devices sends a disable command or a sleep command over the bus to cause the first set of devices to stop operating on the bus.

18. The method of claim 17, wherein the disable command prevents each of the first set of devices from communicating over the bus until a power on reset or hardware reset of the first set of devices.

19. The method of claim 17, wherein the sleep command prevents each of the first set of devices from communicating over the bus until a wakeup command is received over the bus.

20. The method of claim 13, wherein prior to or concurrent with entering the second mode of operation, at least one device from the second set of devices causes the first set of devices to enter a sleep or disabled mode.

21. The method of claim 13, wherein during the second mode of operation the first set of devices are unaffected by bus activity.

22. The method of claim 13, wherein each of the first set of devices includes a receiver device capable of at least partially decoding signals on the bus using just a clock signal embedded within signals transmitted according to the first communication protocol.

23. The method of claim 22, wherein the receiver device enters into a sleep mode or disabled mode upon receipt of a sleep command or disable command, respectively.

24. The method of claim 22, wherein the receiver device wakes up upon receipt of a wakeup command.

25. The method of claim 13, wherein the first communication protocol is one of a camera control interface extended (CCIe) protocol or an I2C protocol.

26. A device, comprising:
a communication circuit adapted to couple the device to a bus and configured to communicate over the bus according to a first communication protocol, wherein the bus has two lines configured for serial data communication, the bus being operable in at least one mode to communicate the serial data over a first line in accordance with a clock signal transmitted over a second line and operable in another mode to communicate data in a sequence of two-bit symbols using the first line and the second line; and
a control circuit coupled to the communication circuit and adapted to:
configure the communication circuit to communicate over the bus using the first communication protocol, monitor the bus for a sleep or disable command, and reconfigure the communication circuit to ignore activity over the bus upon detection of a sleep or disable command.

27. The device of claim 26, wherein the bus includes two lines.

28. The device of claim 27, wherein in accordance with the first communication protocol a plurality of data bits are encoded in sequences of two-bit symbols transmitted in state of the two lines, and wherein the clock signal is embedded in symbol-to-symbol transitions of the state of the two lines.

29. The device of claim 26, wherein the sleep or disable command causes the device to stop operating over the bus.

30. The device of claim 26, wherein the disable command prevents the device from communicating over the bus until a power on reset or hardware reset of the device.

31. The device of claim 26, wherein the sleep command prevents each of the device from communicating over the bus until a wakeup command is received over the bus.

32. The device of claim 26, wherein the communication circuit includes a receiver device configured to, at least partially, decode signals on the bus using just a clock signal embedded within signals transmitted according to the first communication protocol.

33. A method operational on a device, comprising:
configuring a communication circuit to communicate over a bus using a first communication protocol, wherein the bus has two lines configured for serial data communication, the bus being operable in at least one mode to communicate the serial data over a first line in accordance with a clock signal transmitted over a second line and operable in another mode to communicate data in a sequence of two-bit symbols using the first line and the second line;
monitoring the bus for a sleep or disable command; and
reconfiguring the communication circuit to ignore activity over the bus upon detection of a sleep or disable command.

34. The method of claim 33, further comprising:
receiving the sleep or disable command over the bus from a second device capable of operating in a first mode of operation that uses the first communication protocol and in a second mode of operation that uses a second communication protocol.

35. The method of claim 34, wherein the first communication protocol provides a first data throughput over the bus while the second communication protocol provides a second data throughput over the bus, where the second data throughput is greater than the first data throughput.

36. The method of claim 33, wherein the bus includes two lines, and in a first mode of operation a plurality of data bits are encoded in sequences of two-bit symbols transmitted in state of the two lines, and wherein the clock signal is embedded in symbol-to-symbol transitions of the state of the two lines.

37. The method of claim 33, wherein the sleep or disable command is received prior to or concurrent with the bus being switched to operate according to a second communication protocol unsupported by the device.

38. A device, comprising:
a communication circuit to couple to a bus shared with other devices, wherein the bus is configured for serial data communication, the bus being operable in at least one mode to communicate the serial data over a first line in accordance with a clock signal transmitted over a second line and operable in another mode to communicate data in a sequence of two-bit symbols using the first line and the second line; and
a control circuit coupled to the communication circuit and configured to:
configure the communication circuit to operate in a first mode in which a first communication protocol is used for communicating over the bus;
send a sleep or disable command over the bus to indicate to other devices that do not support a second communication protocol to ignore activity over the bus; and
reconfigure the communication circuit to operate in a second mode in which the second communication protocol is used over the bus.

39. The device of claim 38, wherein the first communication protocol provides a first data throughput over the bus while the second communication protocol provides a second data throughput over the bus, where the second data throughput is greater than the first data throughput.

40. The device of claim 38, wherein the bus includes two lines.

41. The device of claim 40, wherein during a first mode of operation a plurality of data bits are encoded in sequences of two-bit symbols transmitted in state of the two lines, and wherein the clock signal is embedded in symbol-to-symbol transitions of the state of the two lines.

42. The device of claim 38, wherein the disable command prevents the other devices from communicating over the bus until a power on reset or hardware reset of each of the other devices.

43. The device of claim 38, wherein the sleep command prevents the other devices from communicating over the bus until a wakeup command is sent by the device over the bus.

44. The device of claim 38, wherein the sleep or disable command is sent prior to or concurrent with the device entering the second mode.

45. The device of claim 38, wherein the communication circuit includes a receiver device capable of at least partially decoding signals on the bus using just a clock signal embedded within signals transmitted according to the first communication protocol.

46. A method operational on a device, comprising:
configuring a communication circuit to operate in a first mode in which a first communication protocol is used over a bus, wherein the bus is configured for serial data communication, the bus being operable in at least one mode to communicate the serial data over a first line in accordance with a clock signal transmitted over a second line and operable in another mode to communicate data in a sequence of two-bit symbols using the first line and the second line;
sending a sleep or disable command over the bus to indicate to other devices that do not support a second communication protocol to ignore activity over the bus; and
reconfiguring the communication circuit to operate in a second mode in which the second communication protocol is used over the bus.

47. The method of claim 46, wherein the bus includes two lines, and in during a first mode of operation a plurality of data bits are encoded in sequences of two-bit symbols transmitted in state of the two lines, and wherein the clock signal is embedded in symbol-to-symbol transitions of the state of the two lines.

48. The method of claim 46, wherein the sleep or disable command is sent prior to or concurrent with the device entering the second mode.

* * * * *